United States Patent
Kubota et al.

(10) Patent No.: US 7,734,275 B2
(45) Date of Patent: *Jun. 8, 2010

(54) METHOD OF PRODUCING TRAFFIC SIGNAL INFORMATION, METHOD OF PROVIDING TRAFFIC SIGNAL INFORMATION, AND NAVIGATION APPARATUS

(75) Inventors: Tomoki Kubota, Okazaki (JP); Hideto Miyazaki, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/155,642

(22) Filed: Jun. 6, 2008

(65) Prior Publication Data

US 2008/0253615 A1    Oct. 16, 2008

Related U.S. Application Data

(63) Continuation of application No. 11/176,212, filed on Jul. 8, 2005, now Pat. No. 7,398,076.

(30) Foreign Application Priority Data

Jul. 9, 2004    (JP)    ............................. 2004-203524
Oct. 14, 2004   (JP)    ............................. 2004-300437

(51) Int. Cl.
*H04B 1/06*    (2006.01)
*H04W 24/00*   (2009.01)

(52) U.S. Cl. .................... 455/344; 455/345; 455/456.1; 455/456.3

(58) Field of Classification Search ................ 455/344, 455/345, 456.3, 456.1, 457; 701/200, 211, 701/214, 207; 340/988, 990, 995.13, 425.5

See application file for complete search history.

(56) References Cited

U.S. PATENT DOCUMENTS 6,281,808 B1    8/2001    Glier et al.

(Continued)

FOREIGN PATENT DOCUMENTS

DE    100 28 130 A1    12/2001

(Continued)

OTHER PUBLICATIONS

Japanese Patent Office, Notification of Reasons for Rejection mailed on Aug. 18, 2009 in Japanese Patent Application No. 2004-300437.

(Continued)

*Primary Examiner*—Sonny Trinh
(74) *Attorney, Agent, or Firm*—Oliff & Berridge, PLC

(57) ABSTRACT

Systems, methods, and programs of producing and using traffic signal information take, when a vehicle is closely approaching a traffic signal, an image of traffic signal lamps disposed on the traffic signal. The systems, methods, and programs produce image data of the traffic signal lamps, based on the taken image and analyze the image data. The systems, methods, and programs produce traffic signal state information, the traffic signal state information including a state of the traffic signal as of the time of taking the image of the traffic signal lamps. The systems, methods, and programs store traffic signal information, the traffic signal information including the produced traffic signal state information, traffic signal location information, and time information in a memory. The systems, methods, and programs perform a statistical analysis on a correlation in terms of the status of traffic signal lamps among a plurality of traffic signals based on plural pieces of traffic signal information of plural adjacent traffic signals.

20 Claims, 16 Drawing Sheets

U.S. PATENT DOCUMENTS

| | | | |
|---|---|---|---|
| 6,356,836 B1 | 3/2002 | Adolph | |
| 6,396,417 B2 * | 5/2002 | Lee | 340/904 |
| 6,516,262 B2 | 2/2003 | Takenaga et al. | |
| 6,516,273 B1 * | 2/2003 | Pierowicz et al. | 701/301 |
| 6,556,917 B1 | 4/2003 | Wawra et al. | |
| 6,615,130 B2 * | 9/2003 | Myr | 701/117 |
| 6,724,320 B2 * | 4/2004 | Basson et al. | 340/906 |
| 6,728,623 B2 | 4/2004 | Takenaga et al. | |
| 6,925,378 B2 * | 8/2005 | Tzamaloukas | 701/200 |
| 6,972,675 B2 | 12/2005 | Mills et al. | |
| 6,989,766 B2 * | 1/2006 | Mese et al. | 340/907 |
| 7,133,661 B2 | 11/2006 | Hatae et al. | |
| 7,194,347 B2 | 3/2007 | Harumoto et al. | |
| 7,254,482 B2 | 8/2007 | Kawasaki et al. | |
| 7,466,227 B2 * | 12/2008 | Chen et al. | 340/539.13 |
| 2006/0114125 A1 | 6/2006 | Kubota et al. | |

FOREIGN PATENT DOCUMENTS

| | | |
|---|---|---|
| EP | 1 127 727 A2 | 8/2001 |
| JP | A-11-306498 | 11/1999 |
| JP | A-2000-268294 | 9/2000 |
| JP | A-2001-236600 | 8/2001 |
| JP | A-2003-078654 | 3/2003 |
| JP | A-2004-051006 | 2/2004 |
| JP | A-2004-171289 | 6/2004 |

OTHER PUBLICATIONS

Fernyhough, J. et al., "Building Qualitative Event Models Automatically from Visual Input", Proceedings of IEEE $6^{th}$ International Conference on Computer Vision, Jan. 4-7, 1998, Bombay, India, pp. 350-355.

* cited by examiner

| | SIGNAL LOCATION | SIGNAL STATE INFORMATION | DATE/TIME | DRIVING DIRECTION | CURRENT POSITION | VEHICLE SPEED |
|---|---|---|---|---|---|---|
| | 12 | 13 | 14 | 15 | 16 | 17 |
| | $X^{s1}, Y^{s1}, Z^{s1}$ | YELLOW | JUNE 8, 2004: 10:29 | EAST | $(X^{c1}, Y^{c1})$ | 35km/h |
| | $X^{s1}, Y^{s1}, Z^{s1}$ | RED | JUNE 8, 2004: 10:30 | EAST | $(X^{c2}, Y^{c2})$ | 20km/h |
| | $X^{s1}, Y^{s1}, Z^{s1}$ | RED | JUNE 8, 2004: 10:31 | EAST | $(X^{c3}, Y^{c3})$ | 5km/h |
| 11 | $X^{s1}, Y^{s1}, Z^{s1}$ | RED | JUNE 8, 2004: 10:32 | EAST | $(X^{c3}, Y^{c3})$ | 0km/h |
| | $X^{s1}, Y^{s1}, Z^{s1}$ | RED | JUNE 8, 2004: 10:33 | EAST | $(X^{c3}, Y^{c3})$ | 0km/h |
| | ... | ... | ... | ... | ... | ... |
| | $X^{s1}, Y^{s1}, Z^{s1}$ | RED | JUNE 8, 2004: 10:45 | EAST | $(X^{c3}, Y^{c3})$ | 0km/h |
| | $X^{s1}, Y^{s1}, Z^{s1}$ | GREEN | JUNE 8, 2004: 10:46 | EAST | $(X^{c3}, Y^{c3})$ | 0km/h |
| | $X^{s1}, Y^{s1}, Z^{s1}$ | GREEN | JUNE 8, 2004: 10:47 | EAST | $(X^{c4}, Y^{c4})$ | 20km/h |
| | ... | ... | ... | ... | ... | ... |

| SIGNAL LOCATION 12 | SIGNAL STATE INFORMATION 13 | DATE/TIME 14 | DRIVING DIRECTION 15 | CURRENT POSITION 16 | VEHICLE SPEED 17 |
|---|---|---|---|---|---|
| $X^s2, Y^s2, Z^s2$ | RED | JUNE 8, 2004: 30:00 | SOUTH | $(X^c5, Y^c5)$ | 0km/h |
| $X^s2, Y^s2, Z^s2$ | RIGHT-TURN(ARROW) | JUNE 8, 2004: 30:01 | SOUTH | $(X^c5, Y^c5)$ | 0km/h |
| $X^s2, Y^s2, Z^s2$ | RIGHT-TURN(ARROW) | JUNE 8, 2004: 30:02 | SOUTH | $(X^c6, Y^c6)$ | 30km/h |
| $X^s2, Y^s2, Z^s2$ | RIGHT-TURN(ARROW) | JUNE 8, 2004: 30:03 | SOUTH | $(X^c6, Y^c6)$ | 40km/h |
| $X^s2, Y^s2, Z^s2$ | RIGHT-TURN(ARROW) | JUNE 8, 2004: 30:04 | ... | $(X^c6, Y^c6)$ | 40km/h |
| ... | ... | ... | ... | ... | ... |

FIG. 6

| | SIGNAL LOCATION | SIGNAL STATE INFORMATION | DATE/TIME | DRIVING DIRECTION | CURRENT POSITION | VEHICLE SPEED |
|---|---|---|---|---|---|---|
| | 12 | 13 | 14 | 15 | 16 | 17 |
| 11 | $X^{s}1, Y^{s}1, Z^{s}1$ | YELLOW | JUNE 8, 2004: 10:29 | EAST | $(X^{c}1, Y^{c}1)$ | 35km/h |
| | $X^{s}1, Y^{s}1, Z^{s}1$ | RED | JUNE 8, 2004: 10:30 | EAST | $(X^{c}2, Y^{c}2)$ | 20km/h |
| | $X^{s}1, Y^{s}1, Z^{s}1$ | GREEN | JUNE 8, 2004: 10:46 | EAST | $(X^{c}3, Y^{c}3)$ | 0km/h |
| | ... | ... | ... | ... | ... | ... |

METHOD OF PRODUCING TRAFFIC SIGNAL INFORMATION, METHOD OF PROVIDING TRAFFIC SIGNAL INFORMATION, AND NAVIGATION APPARATUS

This is a Continuation of application Ser. No. 11/176,212, filed Jul. 8, 2005. The entire disclosure of the prior application is hereby incorporated by reference herein in its entirety.

INCORPORATION BY REFERENCE

This application claims priority of Japanese Patent Applications Nos. 2004-203525, filed Jul. 9, 2004, and 2004-300437, filed on Oct. 14, 2004, the disclosures of which, including the specifications, drawings, and abstracts, are incorporated herein by reference in their entirety.

BACKGROUND OF THE INVENTION

1. Related Technical Fields

Related technical fields include methods of producing traffic signal information, a method of providing traffic signal information, and navigation apparatus.

2. Description of the Related Art

Conventional navigation apparatus search for a route from a current position to destination and display a detected route. Conventional navigation apparatus include map data, including road information and signal location information, stored on an external storage medium such as a hard disk or an optical disk. The conventional navigation apparatus display, on a display, a map indicating locations such as intersections where traffic signals are disposed. However, the navigation apparatus does not provide information associated with the status of the traffic signals.

An in-vehicle camera system has been proposed to take an image of a signal using an in-vehicle camera (as disclosed, for example, Japanese Unexamined Patent Application Publication No. 11-306498). In this system, an image of a signal is compared with color information stored in a storage unit to identify the current color of the signal, and the various characteristic of the vehicle, such as the vehicle speed, is controlled based on the comparison.

SUMMARY OF THE INVENTION

The above-described in-vehicle camera system does not have the capability of predicting how long the signal will remain in the current status or when the signal will change. That is, the system is capable of controlling the vehicle in accordance with the current status of a signal, but is not capable of providing information on a predicted waiting time at a signal or a predicted time at which the signal will change.

There is a possibility that a quick acceleration or deceleration may needed when the status of a signal changes. The above-described in-vehicle camera system is not capable of providing information indicating whether to accelerate or decelerate the vehicle when the vehicle is approaching a signal. Additionally, the system does not provide information about a predicted waiting time at a red signal.

Accordingly, it is beneficial to provide a method of producing traffic signal information, a method of providing traffic signal information, and a navigation apparatus.

It is beneficial to provide a method of producing signal information for predicting the current status of a traffic signal, a method of providing such traffic signal information, and a navigation apparatus capable of providing such traffic signal information.

Thus, various exemplary implementations of the principles described herein provide systems, apparatus, methods, and programs of producing and/or using traffic signal information that may take, when a vehicle is closely approaching a traffic signal, an image of traffic signal lamps disposed on the traffic signal. The systems, apparatus, methods, and programs may produce image data of the traffic signal lamps, based on the taken image and analyze the image data. The systems, apparatus, methods, and programs may produce traffic signal state information, the traffic signal state information including a state of the traffic signal as of the time of taking the image of the traffic signal lamps. The systems, apparatus, methods, and programs may store traffic signal information, the traffic signal information including the produced traffic signal state information, traffic signal location information, and time information in a memory. The systems, methods, and programs may perform a statistical analysis on a correlation in terms of the status of traffic signal lamps among a plurality of traffic signals based on plural pieces of traffic signal information of plural adjacent traffic signals.

BRIEF DESCRIPTION OF THE DRAWINGS

Exemplary implementations will now be described with reference to the accompanying drawings, wherein:

FIG. 5 is a diagram showing data stored in a memory according to an exemplary implementation of the principles described herein;

FIG. 6 is a diagram showing data stored in a memory according to an exemplary implementation of the principles described herein;

FIG. 10 is a diagram showing data stored in a memory according to an exemplary implementation of the principles described herein;

DESCRIPTION OF THE PREFERRED EMBODIMENTS

Figure 1:
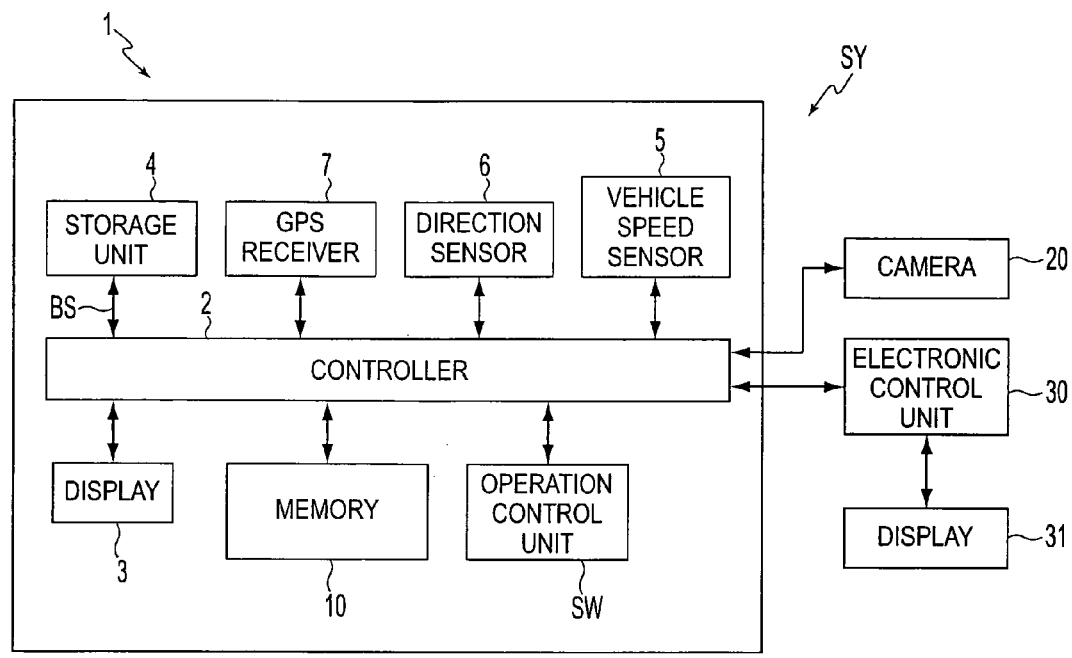
FIG. 1 is a block diagram showing a configuration of a navigation apparatus according to an exemplary implementation of the principles described herein.
Figure 2:
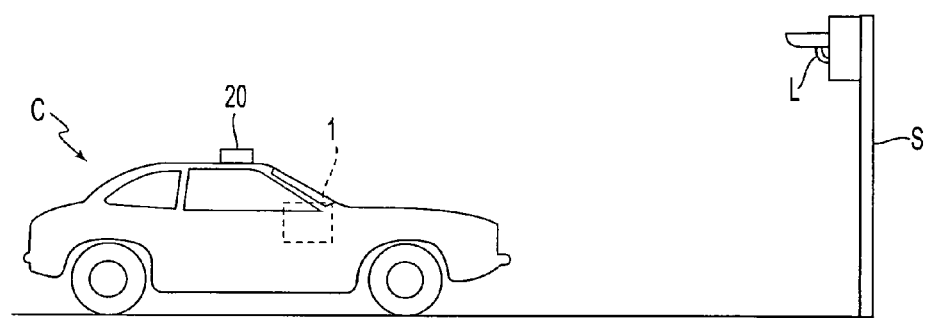
FIG. 2 is a diagram showing a vehicle having a navigation apparatus and approaching a signal.

A first example of a system for producing and providing traffic signal information will be described with reference to FIGS. 1-9. FIG. 1 is a block diagram showing an exemplary configuration of a navigation apparatus 1. As shown in FIG. 2, the navigation apparatus 1 may serve as an in-vehicle terminal installed in a vehicle, for example car C. The navigation apparatus 1 may physically, functionally, and/or conceptually include a controller 2. The controller 2 may perform route guidance, for example based on instructions. Route guidance may include searching for a route from a current position to a destination and outputting a map including a detected route. The controller 2 may transmit and/or receive various kinds of data to/from, for example, an electronic control unit (ECU) 30 of the car C.

Instructions, including the route guidance instructions may be stored in a memory 4 that may be connected to the controller 2, for example, via a bus BS. The memory 4 may also store map attribute information including, for example, node data, road information, and traffic signal location information. Furthermore, display data that may be used to display various kinds of screens on, for example, a display 3 may also be stored in the memory 4. The memory may include, for example, a RAM, a ROM, and/or an external storage medium, such as, for example, an optical disk.

The navigation apparatus 1 may include, for example, a vehicle speed sensor 5, a direction sensor 6, and/or a GPS receiver 7. Based on detection signals output from one or more of the vehicle speed sensor 5, the direction sensor 6, and/or the GPS receiver 7, the controller 2 may detect the position of the car C.

The navigation apparatus 1 may also include, for example, a traffic signal memory 10. The traffic signal memory 10 may store, for example, traffic signal information associated with each on-road traffic signal S (e.g., shown in FIG. 2), in form of, for example, a database. The navigation apparatus 1 may further include, for example, an input unit SW that may have, for example, switches, button, keys, and/or a touch screen for use by a user to specify a route guiding/searching condition such as a destination.

A camera 20 may be connected to the navigation apparatus 1. The camera 20 may be capable of transmitting and/or receiving data to/from the controller 2 of the navigation apparatus 1. For example, a color CCD camera may be used as the camera 20. As shown in FIG. 2, the camera 20 may be disposed on the outer surface of the car C or disposed inside the car C at a location close to the windshield capture a traffic signal within a predetermined angle. The camera 20 may include a driver unit (not shown), for example, capable of controlling the orientation of an imaging lens in accordance with a control signal supplied from the controller 2. As shown in FIG. 2, when the car C approaches a traffic signal S and comes within a predetermined range that allows the camera 20 to take an image of the traffic signal S, such as, for example, 20 meters, the camera 20 may take an image of the traffic signal lamps L of the traffic signal S, for example, under the control of the controller 2. The combination of the camera 20 and the navigation apparatus 1 may form a traffic signal information generation system SY.

Figure 3:
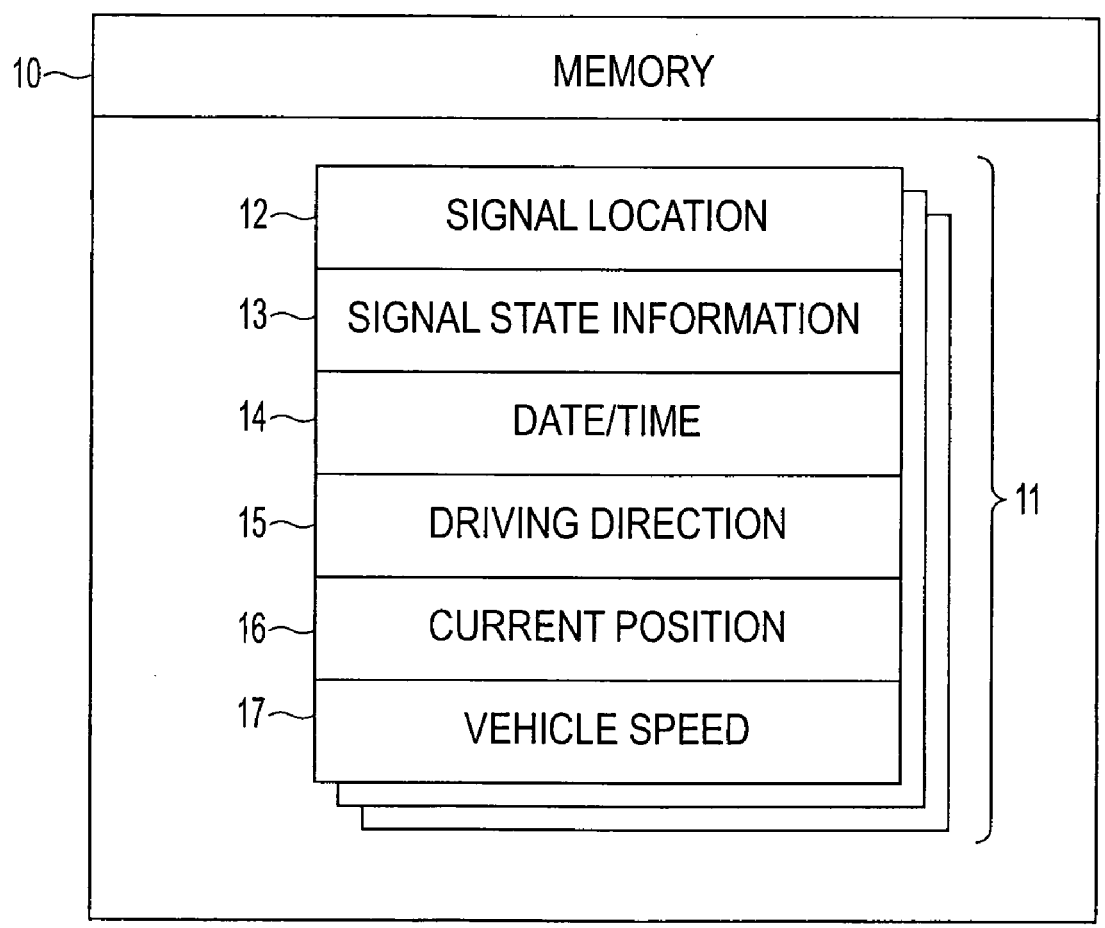
FIG. 3 is a diagram showing a data structure of data stored in a memory of a navigation apparatus according to an exemplary implementation of the principles described herein.

The exemplary traffic signal memory 10 is described in further detail with reference to FIG. 3. FIG. 3 shows an exemplary data structure of traffic signal information 11, for example, stored in the traffic signal memory 10. The traffic signal information 11 may be information associated with traffic signals such as, for example, the traffic signal S. Each time the car C passes by a traffic signal S, the traffic signal information 11 may be produced for that traffic signal S.

As shown in FIG. 3, the traffic signal information 11 may be physically, functionally, and/or conceptually divided into, for example, traffic signal location information 12, traffic signal state information 13, date/time information 14, driving direction information 15, current position information 16, and/or vehicle speed information 17. The traffic signal location 12 may include three-dimensional coordinate data indicating the position and the height of the location where the traffic signal S is installed, and the traffic signal location 12 may correspond to a node or a link of the node data.

As used herein, the term link refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term node refers to a point connecting two links. A node may be, for example, an intersection, an intersection having more than three roads, a curve, and/or a point at which the road type changes The traffic signal state information 13 may include information indicating the status, such as the color, of the traffic signal lamp L or the status of an arrow lamp indicating the right turn or the like of the traffic signal S when the car C is approaching the traffic signal S. The date/time 14 may include information indicating, of r example, the year, month, day, and time at which the image of the traffic signal lamp L of the traffic signal S was taken. The time may be represented in hours, minutes, and seconds. The driving direction 15 may indicate the direction of the car C when the image of the traffic signal lamp L is taken. The current position 16 may indicate the position of the car C when the image of the traffic signal lamp L is taken. The vehicle speed 17 may indicate the speed of the car C when the image of the traffic signal lamp L is taken.

An exemplary method of producing traffic signal information 11 is described below with reference to FIGS. 4 to 6. The exemplary method may be implemented, for example, by the above-described traffic signal information generation system SY. However, it should be appreciated that the exemplary method need not be limited by any of the above-described structure.

As shown in FIG. 3, when the car C is driving on a road, a route to a specified destination may be searched for. The route may be searched for, for example, by the navigation apparatus 1.

First, a current position is detected, for example, using the GPS receiver 7 under control of the controller 2 (step S1-1). Then a navigation route from the current position to a destination is searched for (step S1-2). The destination may be indicated by destination information input by a user via the input unit SW, and the route may be searched for under control of the controller 2 by using data including node data and/or link data stored in the memory 4. If the navigation route is determined and driving is started along the navigation route, route guidance is performed (step S1-3), for example by the controller 2. Next it is determined whether route guidance is complete (step S1-4) and whether there is a traffic signal S ahead of the car C (step S1-5). In determining whether there is a traffic signal S ahead of the car C, map attribute information for an area with a size of, for example about a few hundred to about a few thousand meters including the current position of the car C may be extracted, and the determination may be made based on the current position and the traffic signal location information included in the extracted map attribute information.

When it is determined that there is a traffic signal (step S1-5=YES), the distance between the car C and the traffic signal S is calculated (step S1-6), for example, by the controller 2, to determine whether the car C is within a predetermined range of the traffic signal S (step S1-7).

If the car C is within the predetermined range (step S1-7=YES), an image of traffic signal lamps L of the traffic signal S is taken at predetermined intervals (e.g., of about one sec), for example, by the camera 20 under control of the controller 2. The traffic signal image (image data) is then used to generate traffic signal information (step S1-8). The operation of taking an image of the traffic signal lamp L of the traffic signal S may be performed, for example, at intervals of about one sec. while adjusting the direction of the camera 20 until the car C passes by the traffic signal S (S1-9=YES). In generating the traffic signal information, for example, the controller 2 may acquire the traffic signal images taken at intervals of about one sec. and may perform image processing on each traffic signal image to detect a color of the traffic signal lamp L, a status of a right-turn lamp, and/or a status of a left-turn lamp. Based on the detection result, for example, the controller 2 may produce the traffic signal information associated with the traffic signal S and may store the produced traffic signal information in, for example, the traffic signal memory 10.

Specifically, for example, as shown in FIGS. 5 and 6, for a given traffic signal image of the traffic signal lamp L, a piece of traffic signal information 11 may be produced and stored including, for example, the traffic signal location 12, the traffic signal state information 13, the date/time 14 of taking the image, the driving direction 15, the current position 16 of the vehicle, and/or the vehicle speed 17 as of when the image was taken. Thus, when the car C passes by a traffic signal S, a pieces of traffic signal information 11 may be produced for each times the image of traffic signal S is taken. That is, if the car C is stopped at a red traffic signal or is stopped before a traffic signal by a traffic jam, a greater number of images of a traffic signal S are taken and a greater number of pieces of traffic signal information 11 are produced. Conversely, if the traffic signal S is in a green-state and thus the car C passes by the traffic signal S without stopping at the traffic signal S, a smaller number of pieces of traffic signal information 11 may be produced.

When the car C passes by the traffic signal S (step S1-9=YES), route guidance continues while monitoring whether there is another traffic signal S ahead of the car C. Thus, each time the car C passes by a traffic signal S, traffic signal information 11 associated with each traffic signal S (e.g., shown in FIG. 5) is produced and, for example, stored in the traffic signal memory 10. Additional traffic signal information 11 may also be produced for a same traffic signal S if the car C passes by that same traffic signal S at any different time. Thus, traffic signal information 11 may be accumulated, for example, in the traffic signal memory 10 and, for example, a database DB associated with the traffic signal S may be produced.

Now, an exemplary process of providing guidance information associated with traffic signals based on traffic signal information 11 is described below with reference to FIG. 7. The exemplary method may be implemented, for example, by the above-described navigation apparatus 1. However, it should again be appreciated that the exemplary method need not be limited by any of the above-described structure.

First, it is determined whether to provide route guidance to a destination (step S2-1). This determination may be made by the controller 2, for example, by checking whether a guidance operation is set in the route guidance mode via the input unit SW.

When the route guidance is being provided along a route determined via the route searching process or when the route guidance is going to be started (step S2-1=YES), the traffic signal information 11 associated with a traffic signal S on the navigation route is extracted from the traffic signal memory 10 (step S2-2). Specifically, for example, the controller 2 may extract the traffic signal location information corresponding to the traffic signal S on the navigation route, based on the map attribute information stored in the memory 4 and the navigation route to the destination. Then, the controller 2 may search the traffic signal memory 10 for the traffic signal information 11 including the same traffic signal location 12 as the extracted traffic signal location information. If the controller 2 finds such traffic signal information 11, the controller 2 may read the traffic signal information 11 from the traffic signal memory 10.

If route guidance is not provided (step S2=NO) the traffic signal information 11 associated with traffic signals located close to the current position of the car C is extracted (step S2-3). Specifically, for example, the controller 2 may detect the traffic signal location of each traffic signal close to the current position, based on map attribute information and information indicating the current position of the car C acquired from the GPS receiver 7. The controller 2 may read the traffic signal information 11 corresponding to each of all detected traffic signal locations from the traffic signal memory 10.

Next, the traffic signal information 11 (e.g., read in step S2-3 or S2-3) is analyzed (step S2-4). For example, the controller 2 may perform a statistical analysis on the traffic signal state information 13 and/or the date/time information 14 described in the traffic signal information 11 in accordance with, for example, statistical analysis instructions stored in the memory 4 in order to predict the most likely state of the traffic signal S from the statistically likely state of the traffic signal S at the same time as the predicted time at which the car C will arrive at the traffic signal S. For example, a traffic signal S may be predicted to be in the green-state at 8:00. When the number of pieces of traffic signal information 11 associated with the traffic signal S of interest is not large enough, or when a likely state of the traffic signal S cannot be statistically determined, for example, the controller 2 may start performing a statistical analysis for another traffic signal S.

In the statistical analysis, for example, the controller 2 may determine, for example, the intervals at which the status of the traffic signal lamp L is switched (in the order red, yellow, green) and/or the on-period for each color (for example, about 60 sec for a red traffic signal). When the number of pieces of traffic signal information 11 associated with the traffic signal S of interest is not large enough, or when no statistical regularity is found among traffic signal information 11, for example, the controller 2 may determine that it is unlikely to statistically determine the intervals and/or the on-period, and the controller 2 may start performing a statistical analysis for another traffic signal S.

The controller 2 may determine whether there is a correlation with an adjacent traffic signal S based on the traffic signal information 11. For example, in some cases, when there are traffic signals S respectively located at successive intersections, these traffic signals are controlled such that change-timing of the state thereof is shifted by, for example, about 10 sec. from one traffic signal to another so that cars can run more smoothly. Thus, the controller 2 may determine the statistical correlation between one traffic signal S and other adjacent traffic signals S.

The controller 2 may also determine whether the switching intervals and/or the on-period are controlled differently depending on the time zone. In some cases, for example, the switching intervals and/or the on-period of a traffic signal are controlled differently depending on whether the current time is in a rush-hour zone or a low-traffic zone. Thus, the controller 2 may determine whether the traffic signal S is operated in a yellow-blinking mode during a particular time zone by making a statistical comparison among plural pieces of traffic pattern information.

Then it is determined whether there is a particular pattern in controlling the traffic signal S as a result of the statistical analysis on the traffic signal information 11 (step S2-5). If no particular pattern in the controlling of the traffic signal S is found as a result of the statistical analysis (step S2-5=NO), route guidance continues in the normal mode.

If there is a particular control pattern for the traffic signal S (that is, if the answer to step S2-5 is yes), it is determined whether the distance from the current position of the car C to the traffic signal S is within a predetermined range. If so, an image of the traffic signal lamp L is taken, for example, by the camera 20 under control of the controller 2 (step S2-6). Then image recognition is performed based on the image transmitted from the camera 20. Based on the result of the image recognition, traffic signal information 11 including traffic signal state information 13 is produced, for example, by the controller 2 and stored in the traffic signal memory 10.

Traffic signal prediction information is produced based on the traffic signal control pattern and the traffic signal state information 13 (step S2-7). The traffic signal prediction information may include information indicating a predicted time when the traffic signal S will change and a predicted duration during which the traffic signal S will remain unchanged. Specifically, for example, the traffic signal prediction information may be produced by the controller 2 based on the detected traffic signal control pattern as described below.

The value of the switching interval of the traffic signal state and the durations of respective traffic signal states may be extracted from the produced traffic signal state information (e.g., produced in step S2-6) may be employed as initial values, and values of the switching interval and the durations of respective traffic signal states of the traffic signal S may be added to the initial values. Then, the time at which the traffic signal S changes into the yellow-state from the red-state, the time at which the traffic signal S changes from the yellow-state into the green-state, the time at which the traffic signal S changes from the red-state into the right-turn-permission state, the duration of the red-state, the duration of the yellow-state, the duration of the green-state, and/or the duration of the right-turn-permission state may be calculated for as many samples as possible.

Based on the traffic signal prediction information, it is determined whether it is possible to pass by the traffic signal S of interest without stopping (step S2-8). Specifically, for example, if the controller 2 determines (e.g., in step S2-6) that the traffic signal lamp L is in the red-state, then the controller 2 may determine that it is not allowed to pass by the traffic signal S without stopping.

If the traffic signal lamp L is in the green-state or yellow-state, the controller 2 may calculate the predicted time necessary for the car C to arrive at the traffic signal S, based on, for example, the current vehicle speed, the current position, and/or the traffic signal location information. The controller 2 may compare the predicted necessary time with the traffic signal prediction information. If the predicted necessary time is longer than the time which the traffic signal S will remain unchanged but within the time in which the traffic signal S will be switched into the red-state, the controller 2 may determine that it is impossible to pass the traffic signal S without stopping. On the other hand, when the predicted necessary time is shorter than the time during which the traffic signal S will remain unchanged, the controller 2 may determine that it possible to pass by the traffic signal S without stopping. If, according to the route, the car C is going to make a right turn at the intersection where the traffic signal S is located and the traffic signal S is of the type that lights a right-turn-permission lamp before the traffic signal S is switched into the red state, the controller 2 may add the duration of the right-turn-permission state to the duration until the transition into the red-state to calculate the total available time.

When it is possible for the car C to pass by the traffic signal S without stopping (step S2-8=YES), it is determined whether the traffic signal lamp L will be in the arrow-lamp mode when the car C arrives at the traffic signal S (step S2-9).

If it is determined that the traffic signal lamp L will be in the arrow-lamp mode (step S2-9=YES), then it is determined whether the car C is going to make a turn in the same direction as the arrow direction. If so, for example, the controller 2 may extract, from the traffic signal prediction information, the time during which the arrow-lamp mode is maintained. Then the predicted time is output (step S2-10). For example, the controller 2 may output via an electronic control unit 30, the predicted time on a display 31 (e.g., FIG. 1 or 8) serving as the display means disposed on a meter panel P of the car C.

Figure 8:
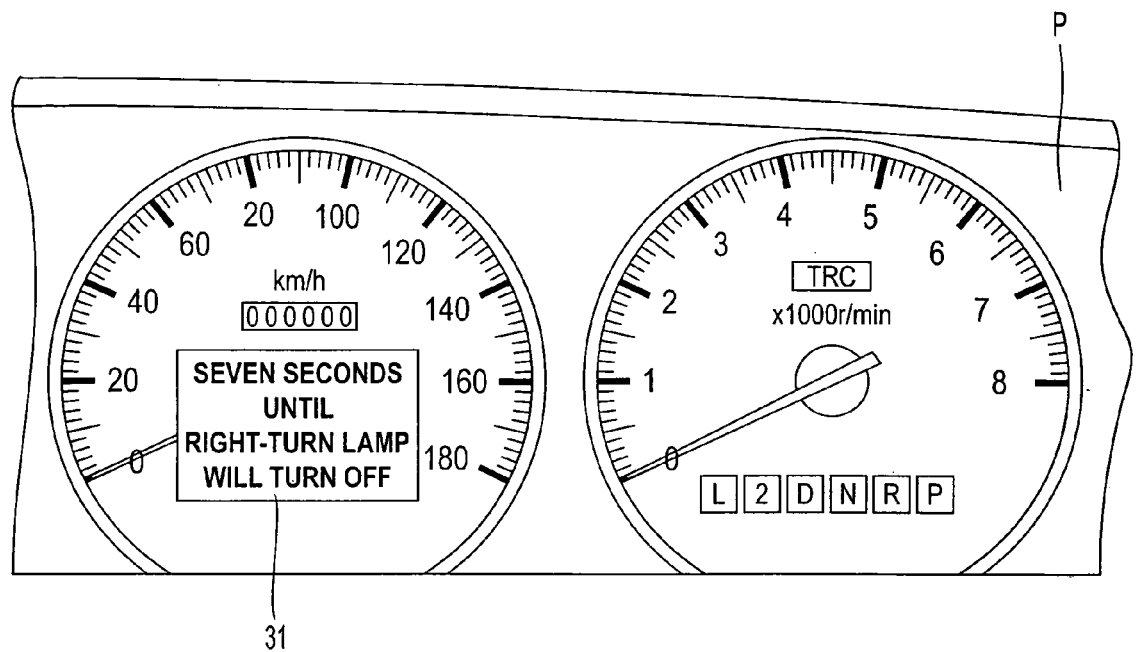
FIG. 8 is a diagram showing a display according to an exemplary implementation of the principles described herein.
Figure 9:
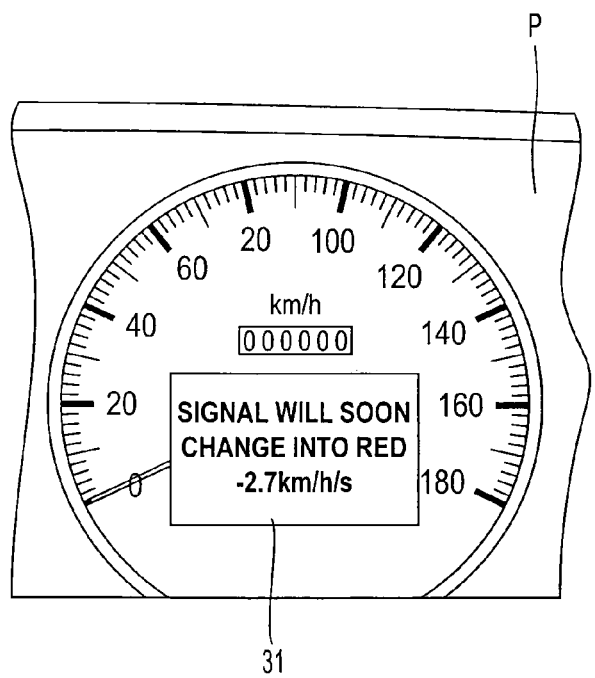
FIG. 9 is a diagram showing a display according to an exemplary implementation of the principles described herein.

Thus, for example, as shown in FIG. 8, displayed traffic signal guide information may included a text message "the right-turn lamp will be turned off in seven seconds" is displayed on the display 31. If it is determined that the traffic signal lamp L will not be in the arrow-lamp mode when the car C arrives at the traffic signal S (step S2-9=NO), or when it is impossible to calculate the predicted time during which the traffic signal S will be in the arrow-lamp mode, it is determined whether to end the route guidance process (step S2-13). If the route guidance is not complete (step S2-13=NO), the exemplary method is repeated for another approaching traffic signal S.

If it is determined that the car C cannot pass by the traffic signal S without stopping (step S2-8=NO), the deceleration of the vehicle speed is calculated (step S2-11). Specifically, for example, the controller 2 may calculate a distance to a car running ahead of the car C by using a car-to-car distance sensor (not shown) disposed on the front side of the car C. The controller 2 may then calculate the speed reduction rate at which the vehicle speed should be reduced, based on, for example, the distance from the current position of the car C to the traffic signal S, the time at which the traffic signal lamp L will be changed into the red-state, the current vehicle speed, and the car-to-car distance.

The speed reduction rate and/or traffic signal guide information is ten displayed (step S2-12). For example, when the traffic signal lamp L is going to be switched into the red-state from the green-state, the controller 2 displays traffic signal guide information including a message "the traffic signal is going to change into the red-state" and the speed reduction rate on the display 31, as shown, for example, in FIG. 9.

However, if the traffic signal prediction information does not include sufficient data and thus the controller 2 cannot determine whether the car C can pass by the traffic signal S without stopping, the display is skipped. It is then determined whether to end the route guidance process (step S2-13). If the route guidance is not complete (step S2-13=NO), the exemplary method is repeated for another approaching traffic signal S.

The controller 2 may repeatedly perform the above-described process of providing guiding information on traffic signals S on the navigation route or in an area in the vicinity of the current position of the car C. When the car goes off the navigation route or when the current position of the car C changes as the car C runs along the navigation route, the controller 2 may repeats the above-described process to detect a traffic signal S located ahead of the car C and provide guidance information associated with detected traffic signal S.

According to the above example, the navigation apparatus 1 installed in the car C may be connected to the camera 20 installed in the car C. When the car C is approaching a traffic signal S, the controller 20 may transmit a control traffic signal to the camera 20 in accordance with the traffic signal location information stored in the memory 4 to take an image of the traffic signal lamp L of the traffic signal S. The navigation apparatus 1 may analyze (by means of image recognition) the image data output from the camera 20 and may produces traffic signal state information 13 identifying the traffic signal status. The produced traffic signal state information 13 may be stored together with traffic signal location information 12 and the date/time information 14, as traffic signal information 11, in the traffic signal memory 10. Each time the car S passes by a traffic signal S, traffic signal information 11 associated with the traffic signal S as of that time may be produced, and thus traffic signal information 11 associated with each traffic signal S may be accumulated in the database associated with traffic signals. Based on this database, it is possible to calculate, for example, the intervals at which the traffic signal state changes, the length of each state of each traffic signal S, the dependence of these parameters on the time, etc., and/or provide information associated with traffic signals to a user.

According to the above example, each time the car C passes a traffic signal S, the camera 20 may take an image of the traffic signal S a plurality of times at intervals of about 1 sec. Thus, a lot of traffic signal information 11 may be collected in the database, and, based on the data collected in the database; it is possible to predict the status of the traffic signal S when the car C arrives at the traffic signal S. It is also possible to predict the period during which the traffic signal S is maintained in a particular status.

According to the above example, the navigation apparatus 1 may statistically analyze a plurality of pieces of traffic signal information 11 to extract a traffic signal control pattern of each traffic signal S, and may produces traffic signal prediction information in terms of the duration of each state of the traffic signal lamp L based on the extracted traffic signal control pattern. Based on the traffic signal prediction information, it is possible to display, on the display 31, information indicating when the traffic signal will change into the red-state or information indicating the time at which a right turn will be permitted. This prevents a vehicle from being suddenly stopped by an unexpected change of a traffic signal into a red-state, or quickly accelerated when a traffic signal changes into the red-state in the middle of an intersection. Furthermore, it becomes possible to prevent a driver from waiting at a traffic signal even after the traffic signal has changed into a green-state without noticing the change.

According to the above example, based on the map attribute information, for example, stored in the memory 4, the navigation apparatus 1 may detect the location of each traffic signal on a navigation route from a current position to a destination or in the vicinity of the current position. Furthermore, when the traffic signal location is detected, the navigation apparatus 1 may determine whether the distance between the car C and the traffic signal location is within a range that allows the camera 20 to take an image of the traffic signal. If so, the navigation apparatus 1 may transmit a control traffic signal to the camera 20 to take an image of the traffic signal. This allows a reduction in the amount of data stored in the navigation apparatus 1, and the camera 20 does not need to have a capability of detecting a traffic signal. The prediction of the traffic signal location ensures that the camera 20 can take an image of the traffic signal without failure. It is also possible to achieve a reduction in the time needed for the camera 20 to perform image recognition, an increase in recognition rate, and a reduction in processing load imposed on the navigation apparatus 1.

Another example will be described with reference to FIG. 10. This example is similar to the above example except for the below modifications. The exemplary method of this example may be implemented, for example, by the above-described navigation apparatus 1. However, it should again be appreciated that the example need not be limited by any of the above-described structure.

Specifically, when a change in the state of the traffic signal lamp L occurs, the controller 2 of the navigation apparatus 1 may stores the traffic signal information 11 in the traffic signal memory 10. Thus, the following explanation will focus on the difference from the above example, and similar parts to those in the above example are denoted by similar reference numerals and a further detailed description thereof is omitted.

Figure 4:
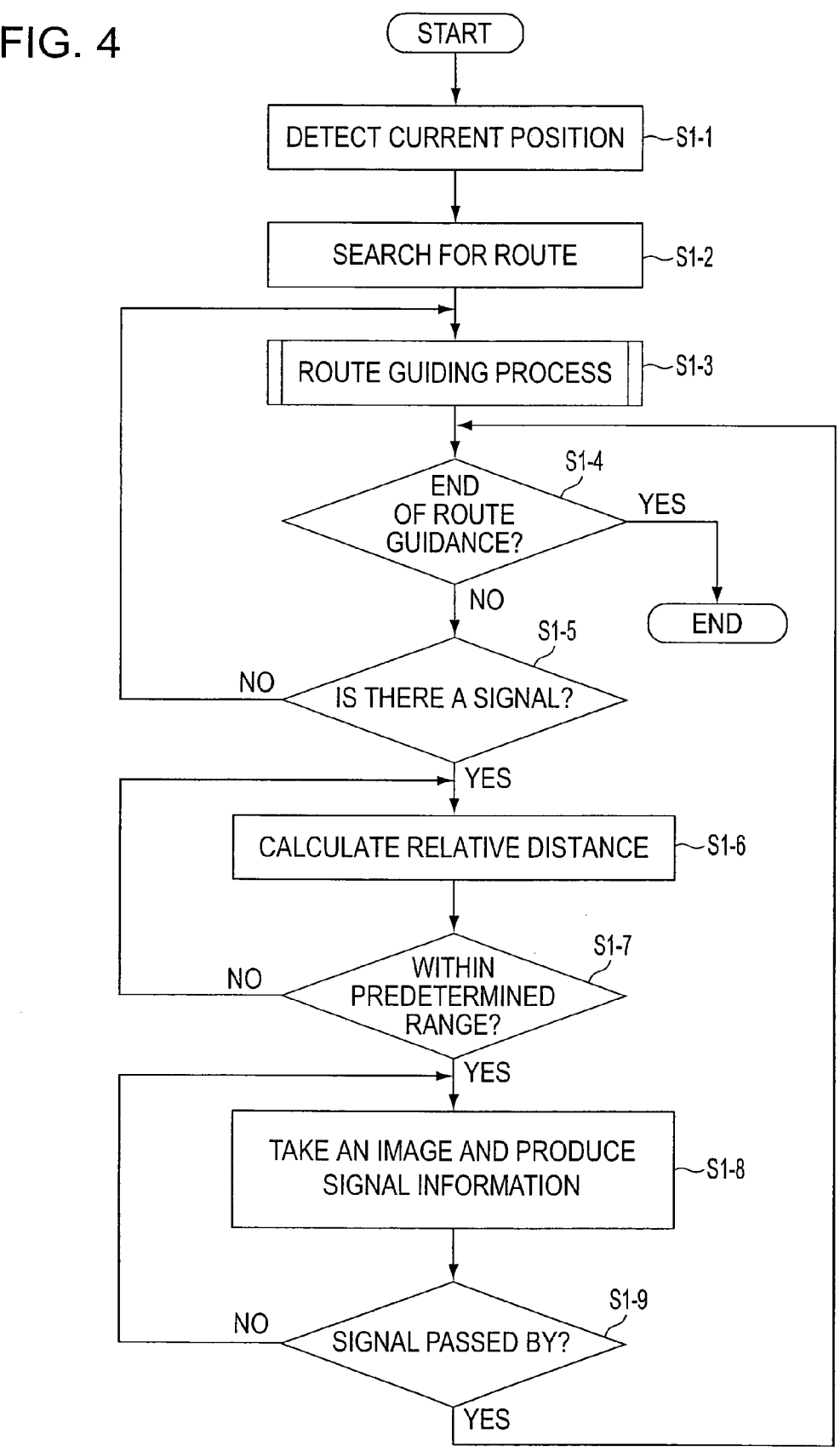
FIG. 4 shows a method of producing traffic signal information according an exemplary implementation of the principles described herein.

In accordance with steps S1-7 and S1-8 in the flow chart shown in FIG. 4, the controller 2 may determines the state of a traffic signal S by means of image recognition. Specifically, if the controller 2 determines that the car C comes into a range (e.g., within abut 20 meters of the traffic signal S) that allows the camera 20 to take an image of the traffic signal lamp L (step S1-7=YES), the controller 2 may transmits a control traffic signal to the camera 20 to take an image of the traffic signal lamp L. Upon receiving the control traffic signal, the camera 20 may takes an image of the traffic signal lamp L at predetermined intervals (e.g., of about 1 sec) to produce a plurality of image data.

The produced image data may be sequentially transmitted together with data indicating the date/time of taking the image to the controller 2. If the controller 2 receives the image data and the date/time data, the controller 2 may analyze the received image data. The controller 2 may store, as traffic signal information 11, the traffic signal state information 13 obtained from the first image together with the date/time 14, the traffic signal location 12, etc. in the traffic signal memory 10, in the top row thereof as shown in FIG. 10.

Similarly, the controller 2 may analyze each image sequentially taken thereafter. The controller 2 may compare the traffic signal state information 13 produced based on the analysis of each image data (indicating, for example, the yellow-state) with the traffic signal state information 13 of the first traffic signal information 11 (indicating, for example the yellow-state) to determine whether a change in the traffic signal state has occurred.

If the traffic signal state information 13 corresponding to second or following image data is identical to the first traffic signal state information 13, the controller 2 may determines that no change has occurred in the traffic signal state. In this case, the controller 2 may not store the traffic signal state information 13 corresponding to second or following image data and will analyze the next image and compares the analysis result with the first traffic signal state information 13.

If the traffic signal state information 13 corresponding to second or following image data indicates, for example, that the traffic signal is in the red-state, and thus it is different from the first traffic signal state information 13, then the controller 2 determines that a change in the traffic signal status has occurred, and the controller 2 stores the traffic signal state information 13 thereof together with the associated data such as the date/time 14 in the traffic signal memory 10.

As a result, the different traffic signal information 11 is stored in a data area next to the first traffic signal information 11. In the example shown in FIG. 10, the different traffic signal information 11 is stored in the second row.

As described above, the controller 2 may sequentially analyze images taken by the camera 20 and may store traffic signal information 11 in the traffic signal memory 10 only when a change in the traffic signal status occurs. In this way, a database DB associated with traffic signal information 11 is produced. Thus, the second example provides the following advantage in addition to the advantages provided by the first example.

That is, according to the second example, when the controller 2 of the navigation apparatus 1 sequentially analyzes images, the controller 2 stores traffic signal information 11 only if the controller 2 detects a difference in the traffic signal status from the first image, i.e., having traffic signal state information 13 different from the traffic signal state information 13. That is, when the controller 2 detects a change in the traffic signal status, the controller 2 may store traffic signal information 11. Thus, it is possible to achieve a reduction in the amount of data stored in the traffic signal memory 10 and a reduction in the processing load imposed on the navigation apparatus 1.

Another example will be described below with reference to FIGS. 11 and 12. This example is similar to the above examples except the following modifications. The exemplary method of this example may be implemented, for example, by the above-described navigation apparatus 1. However, it should again be appreciated that the example need not be limited by any of the above-described structure. The following explanation will be focused on the difference from the above examples and similar parts to those in the above examples are denoted by similar reference numerals and a further detailed description thereof is omitted.

Specifically, when a prediction based on the traffic signal information 11 described in the database DB indicates that the car C will be stopped at a red traffic signal for a long period, a detour may be searched for.

Figure 11:
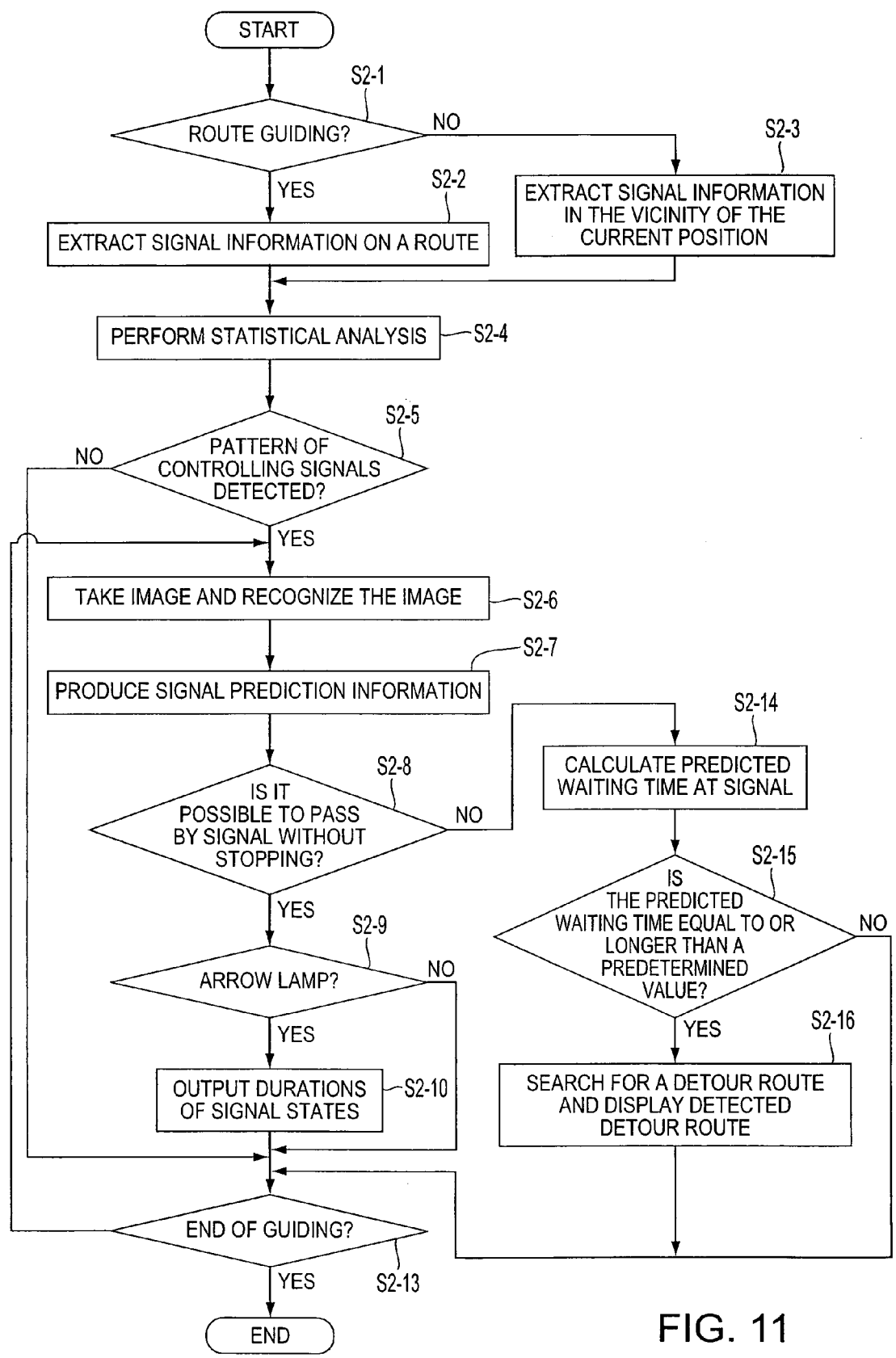
FIG. 11 shows a method of using traffic signal information according an exemplary implementation of the principles described herein.
Figure 12:
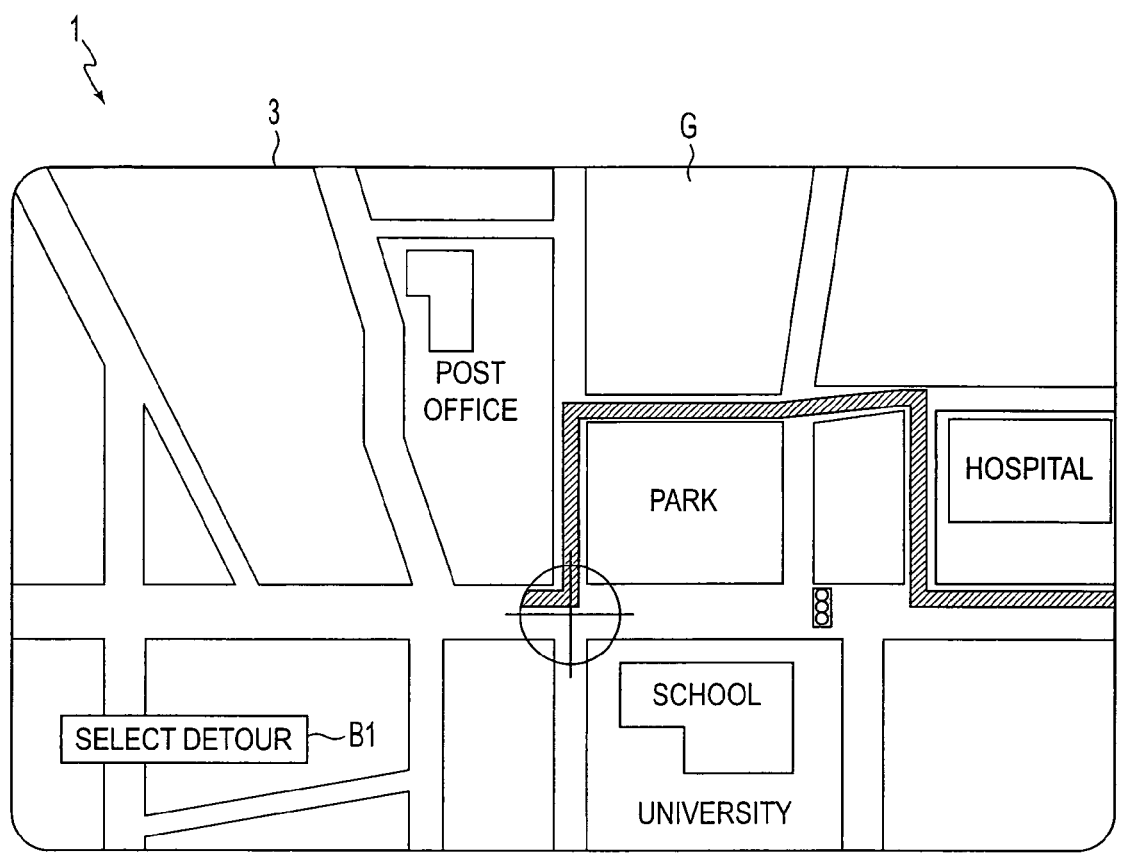
FIG. 12 is a diagram showing a display on a navigation apparatus according to an exemplary implementation of the principles described herein.

For example, as shown in FIG. 11, if it is determined that it is impossible to pass by a traffic signal S without stopping (step S2-8=NO), the predicted period during which the car C will be stopped is calculated (step S2-14). Specifically, based on the traffic signal prediction information, the controller 2 may calculate the predicted time during which the car C has to wait until the traffic signal changes into the green-state from the red-state.

It may then be determined whether the predicted waiting time is equal to or longer than a predetermined value (step S2-15). If the predicted waiting time is less than the predetermined value (step S2-15=NO), then the method may proceed in accordance with the above example(s). On the other hand, if it is determined that the predicted waiting time is equal to or greater than the predetermined value (step S2-15=YES), a detour may be searched for to avoid the long waiting time at that traffic signal S (step S2-16). For example, the controller 2 may search for a detour based on, for example, node data, link data, and/or map attribute information, stored in the memory 4. The controller 2 may than calculate the predicted time needed to run along the detour, based on, for example, the length of the detour. The controller 2 may then compare the time needed to travel to the destination via the detour and the time needed to travel to the destination along the original route including the traffic signal S. Note that the time needed when the original route is taken includes the waiting time at the traffic signal S.

If the necessary time for the detour route is longer than the necessary time for the original route, then the method may proceed in accordance with the above example(s). On the other hand, if the detour route allows the car C to reach the destination in a shorter time than the original route, the controller 2 may output the detour route. For example, the controller 2 may displays a message such as "detour is recommended" on the display 31. Then, as shown in FIG. 12, if a user selects a selection button B1 displayed on the display 3 of the navigation apparatus 1, the controller 2 may display a map including the detour route on the display 3. Specifically, for example, as shown in FIG. 12, a map screen G including the detour route highlighted by color is displayed on the display 3. Thus, the third example provides the following advantages.

According to the third example, when the navigation apparatus 1 determines, based on the traffic signal prediction information, that a waiting time at a red traffic signal will be equal to or longer than the predetermined value, the navigation apparatus 1 may search for a detour to avoid the long waiting time at the red traffic signal. The navigation apparatus 1 may display the detected detour route on the display 3 of the navigation apparatus 1. Thus, according to the third example, route guidance taking into account waiting times at red traffic signals may be provided.

Figure 13:
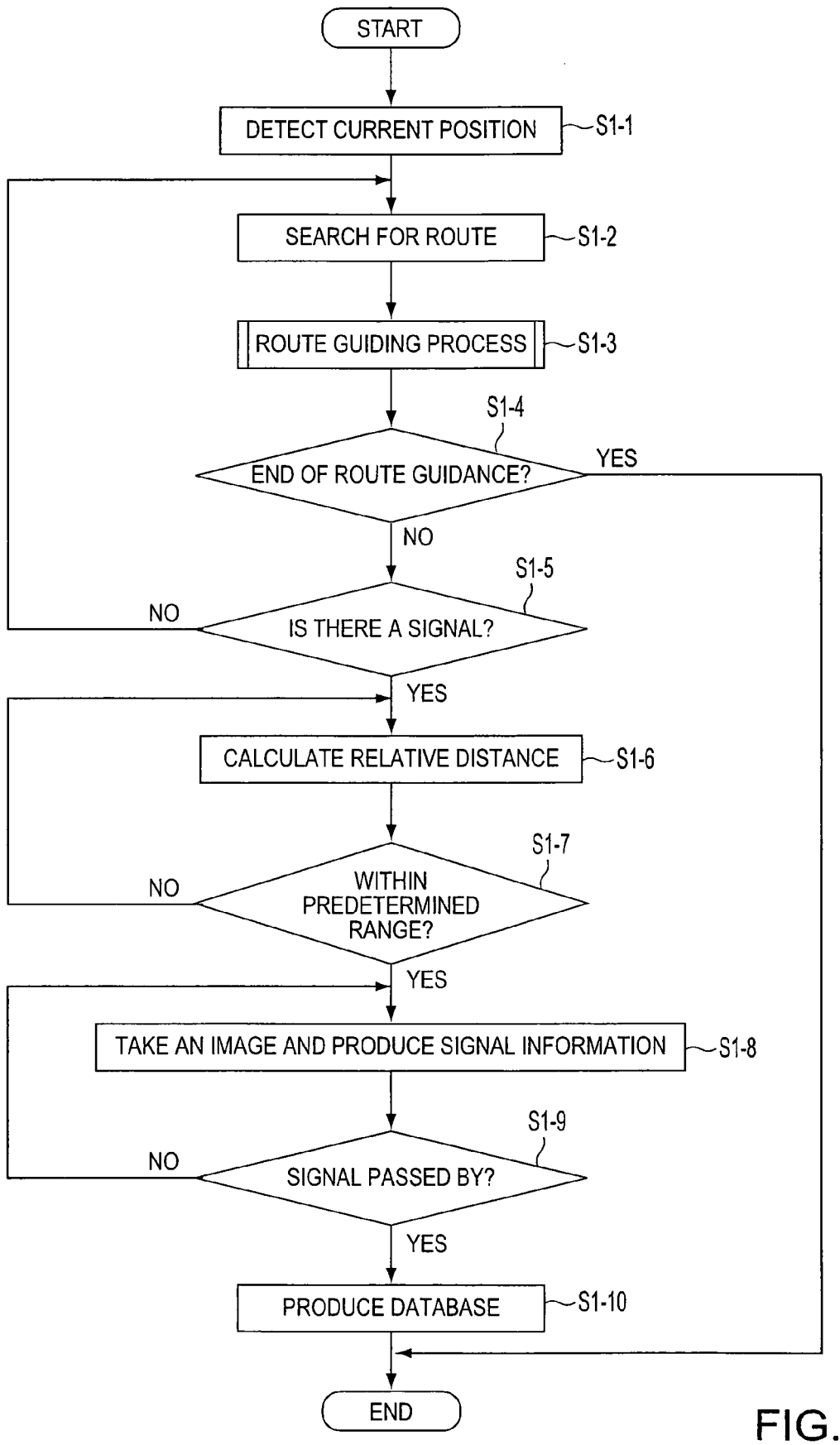
FIG. 13 shows a method of using traffic signal information according an exemplary implementation of the principles described herein.

Another example will be described below with reference to FIGS. 7 and 13. The exemplary method of this example may be implemented, for example, by the above-described navigation apparatus 1. However, it should again be appreciated that the example need not be limited by any of the above-described structure. This fourth example is similar to the above examples except the following modification. The following explanation will be focused on the difference from the above examples, and similar parts to those in the above examples are denoted by similar reference numerals and a further detailed description thereof is omitted.

When there is a correlation in the pattern of the control of traffic signal status among adjacent traffic signals S, information associated with an adjacent traffic signal S may be provided depending on traffic signal information associated with a traffic signal S at a previous location. Thus, as shown in FIG. 13, if it is determined that the car C can pass by a traffic signal S without stopping (step S1-9=YES), a database DB based on the traffic signal information 11 may be produced, for example, by the controller 2 and accumulated in the traffic signal memory 10 (step S1-10). For example, the controller 2 may perform a statistical analysis on the traffic signal information 11 (e.g., acquired in step S1-8). The traffic signal information 11 may be stored in the past to determine the dependence of the control of the traffic signal state on the time, the intervals at which the traffic signal state is switched, and the duration period of each traffic signal state. Furthermore, the controller 2 may determine whether there is a correlation in the manner of controlling the traffic signal state between a traffic signal and an adjacent traffic signal S. If a correlation is detected, the controller 2 may produce data indicting the correlation by, for example, a value or an equation. When the controller 2 obtains data indicating the statistical dependence of the manner of controlling the traffic signal state on the time, the controller 2 may store the obtained data such that the data is linked to the traffic signal information 11.

Accordingly, when, for example, the controller 2 determines whether it is possible to pass by a traffic signal S without stopping (e.g., ins step S2-8), the controller 2 may searches for correlation data linked to traffic signal information 11 to determine whether there is a correlation in terms of the manner of controlling the traffic signal state between the current traffic signal S, which will be passed, and an adjacent traffic signal S. If a correlation is detected, the controller 2 may determines whether it is possible to pass by both the current traffic signal S and the adjacent traffic signal S without stopping, based on the data indicating the statistical dependence of the manner of controlling the traffic signal state on the time.

If the controller 2 determines that it is impossible to pass by the traffic signal without stopping (step S2-8=NO), the controller 2 may then advances the process to (e.g., to step S2-11) to calculate the speed reduction rate. If the determination is made for the linked adjacent traffic signal S also, the controller 2 may also determine which one of the traffic signal S cannot be passed by without stopping. For example, based on the vehicle speed and the distance to the traffic signal S, the controller 2 may determine, for example, that it is possible to pass by the current traffic signal S without stopping but is impossible to pass by the next traffic signal S without stopping. The controller 2 may then calculate the vehicle speed necessary to pass by the current traffic signal S and then stop at the next traffic signal S.

The controller 2 may then output the traffic signal guide information indicating the corresponding speed reduction rate. When the determination as to whether it is possible to pass by the adjacent traffic signal S has been made, the traffic signal guide information displayed on the display 31 may include, for example, a message "a first traffic signal can be passed by without stopping, but a next traffic signal cannot be passed by without stopping." In the case in which an optimum vehicle speed to pass by the traffic signal S is determined, the traffic signal guide information may include such information. Thus, the fourth example provides the following advantages.

According to the fourth example, the controller 2 of the navigation apparatus 1 may perform a statistical analysis on the traffic signal information 11 associated with respective adjacent traffic signals S to detect the correlation in terms of the manner of controlling the status of the traffic signal lamp L among adjacent traffic signals S. The controller 2 may produce data indicating the detected correlation. Based on the correlation data, the controller 2 may produce traffic signal guide information associated with each traffic signal S and may display it on the display 31. Thus, it is possible to provide not only traffic signal guide information associated with the first traffic signal S but also traffic signal guide information associated with the following traffic signal S. This prevents a vehicle from being suddenly stopped by an unexpected change of a traffic signal into a red-state, or quickly accelerated when a traffic signal changes into the red state in the middle of an intersection. Thus, the driver can safely drive a car in accordance with the traffic signal guide information.

Figure 14:
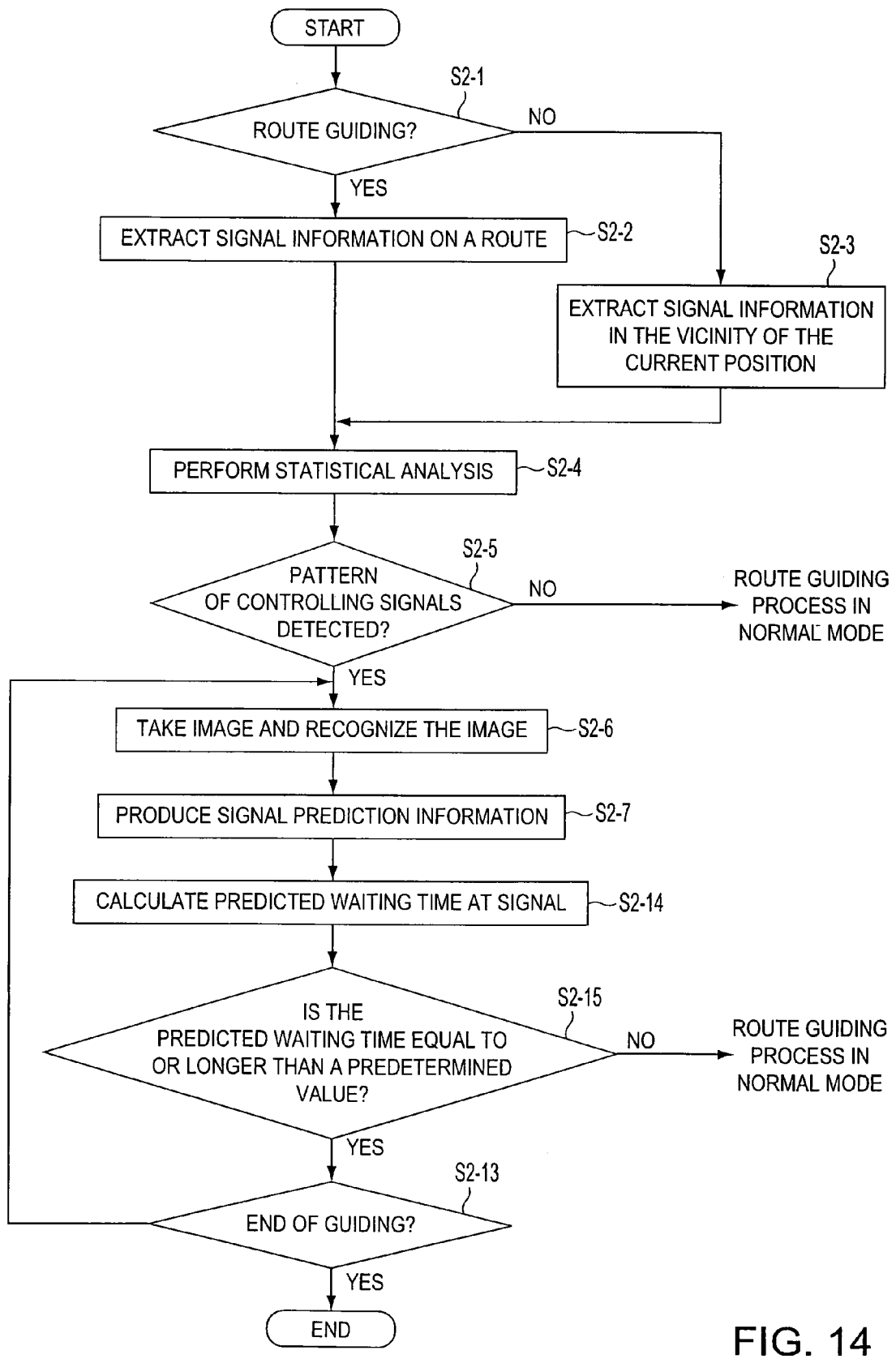
FIG. 14 shows a method of using traffic signal information according an exemplary implementation of the principles described herein.
Figure 15:
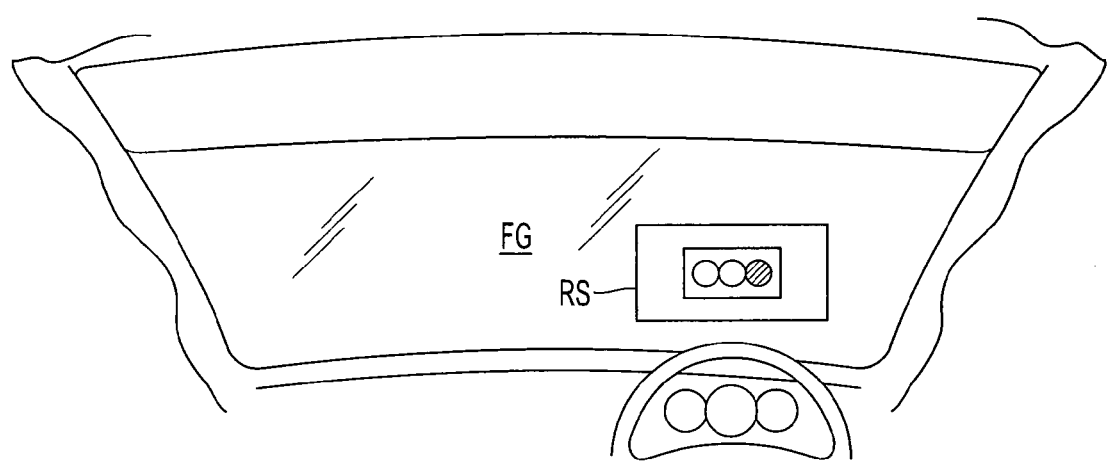
FIG. 15 is a diagram showing a display according to an exemplary implementation of the principles described herein.

Another example will be described below with reference to FIGS. 14 and 15. This fifth example is similar to the above examples except for the following modifications. The exemplary method of this example may be implemented, for example, by the above-described navigation apparatus 1. However, it should again be appreciated that the example need not be limited by any of the above-described structure. The following explanation will be focused on differences from the above examples, and similar parts to those in the above examples are denoted by similar reference numerals and a further detailed description thereof is omitted.

That traffic signal guide information may be displayed when the camera 20 cannot capture an image of a traffic signal lamp L because of an obstacle such as a large-size vehicle running ahead of the car C.

After traffic signal prediction information is produced (e.g., step S2-7), the controller 2 may receives image data output from the camera 20 and may determine whether it is possible to recognize the state of the traffic signal lamp L of a traffic signal (step S2-14). That is, the controller 2 may analyze the image data received from the camera 20 to determine whether it is possible to recognize the traffic signal lamp L. If it is impossible to recognize the traffic signal lamp L of the traffic signal S (step S2-14=YES), the controller 2 may display traffic signal guide information (step S2-15). For example, the controller 2 may transmit traffic signal guide information produced based on the traffic signal prediction information determined via the statistical analysis a projector (not shown) in the car C. As shown in FIG. 15, the projector may projects traffic signal guide information onto a semi-transparent reflecting sheet RS serving as display means disposed, for example, on a windshield FG of the car C such that an image of a traffic signal is displayed on the reflecting sheet RS and thus a user can view the image of the traffic signal. Information of the car location may also be displayed on the reflecting sheet RS to show the distance between the car C and the traffic signal S. Furthermore, a message indicating whether or not the car C can pass by the traffic signal S without stopping may also be displayed.

If it is possible to recognize the traffic signal S (step S2-14=NO), i.e., it is determined that there is no obstacle such as a large-size vehicle that blocks the vision of a driver, and the controller 2 may provides route guidance in the normal mode. In this case, traffic signal guide information based on traffic signal prediction information may be displayed on the reflecting sheet RS. Thus, the fifth example provides the following advantages.

The controller 2 of the navigation apparatus 1 may analyze the image data output from the camera 20 to determine whether it is possible to recognize the state of the traffic signal lamp L of a traffic signal S. If it is impossible to recognize the state of the traffic signal lamp L, traffic signal guide information associated with the traffic signal S may be displayed on the windshield FG. This makes it possible to provide information associated with the traffic signal S located ahead of the car C when a driver cannot directly view the traffic signal S because of an obstacle such as a large-size vehicle. This prevents a vehicle from being suddenly stopped by an unexpected change of a traffic signal into a red-state, or quickly accelerated when a traffic signal changes into the red-state in the middle of an intersection. Thus, the drive can safely drive a car in accordance with the traffic signal guide information.

Another example will be described below with reference to FIG. 16. This sixth example is similar to the above examples except for the following modifications. The exemplary method of this example may be implemented, for example, by the above-described navigation apparatus 1. However, it should again be appreciated that the example need not be limited by any of the above-described structure. The following explanation will be focused on differences from the above examples, and similar parts to those in the above examples are denoted by similar reference numerals and a further detailed description thereof is omitted.

Traffic signal guide information may be displayed when the camera 20 cannot capture an image of a traffic signal lamp L because of an obstacle such as a large-size vehicle running ahead of the car C. That traffic signal guide information may be displayed when running-ahead-vehicle detector detects a large-size vehicle running ahead of the car C.

Figure 16:
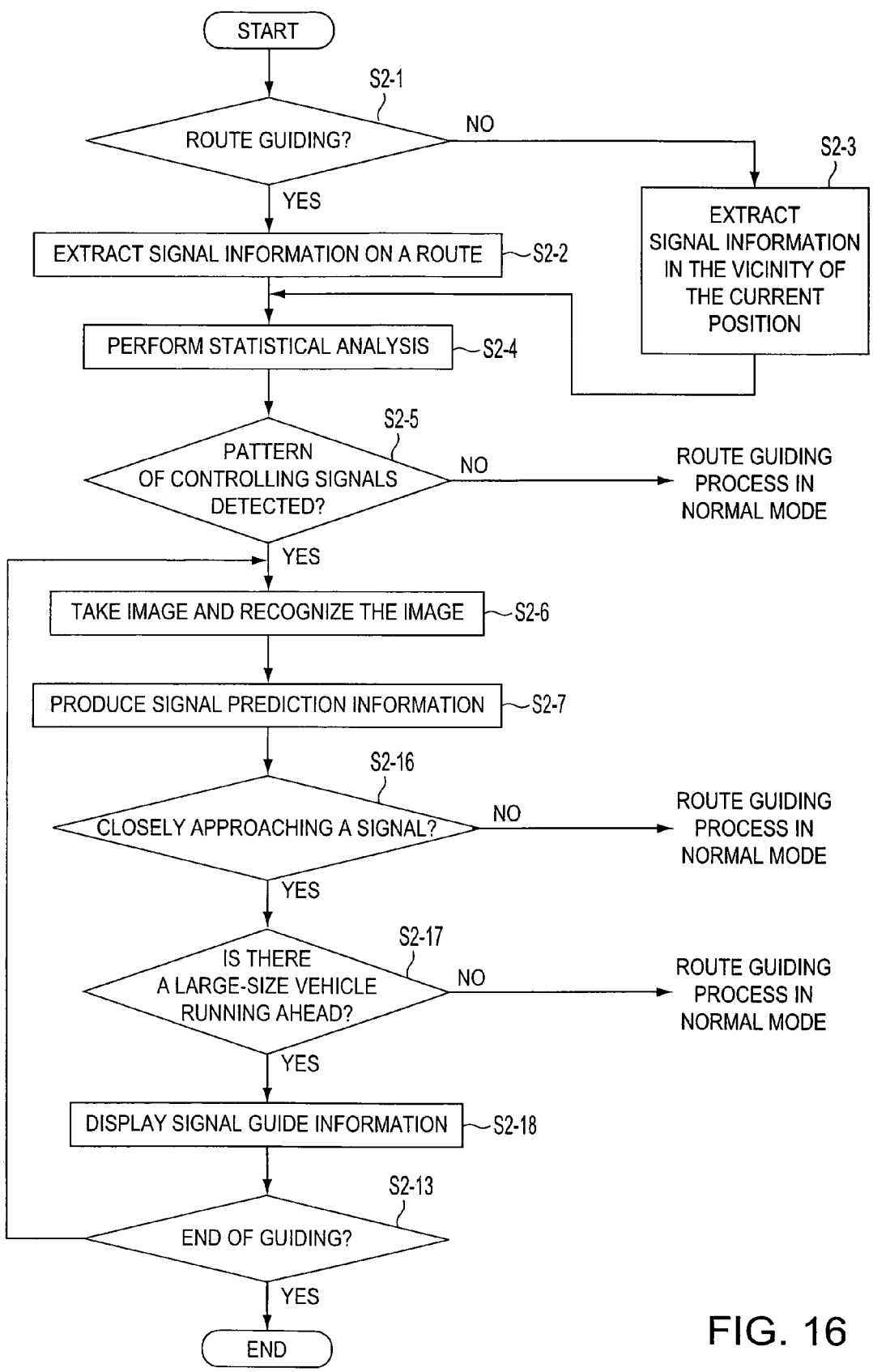
FIG. 16 shows a method of using traffic signal information according an exemplary implementation of the principles described herein.

As shown in FIG. 16, after the controller 2 produces traffic signal prediction information (e.g., step S2-7), the controller 2 may calculate the distance between the car C and the traffic signal S to determine whether the car C is closely approaching the traffic signal S (step S2-16). For example, if the controller 2 determines that the location of the car C is as close as 100 m to the traffic signal S (step S2-16=YES), the controller 2 may determine whether there is a large-size vehicle running ahead of the car C (step S2-17). On the other hand, if the controller 2 determines that the car is not close enough to the traffic signal S (step S2-16=NO), the controller 2 performs the route guiding process in accordance with the above examples.

The determination as to whether there is a large-size vehicle may be made by analyzing image data output from the camera 20. In this step, the controller 2 may calculate the car-to-car distance based on a detection traffic signal output from a car-to-car distance detector, such as, for example, a laser radar, a millimeter-wave radar, or an ultrasonic sonar disposed on the car C. Then the controller 2 may determine that there is a large-size vehicle running ahead of the car C only when the detected car-to-car distance is less than a predetermined value.

If there is a large-size vehicle running ahead of the car C (step S2-17=YES), traffic signal guide information my be displayed (step S2-18). On the other hand, when it is determined that there is no large-size vehicle running ahead of the car C (step S2-17=NO), the controller 2 performs the route guiding process in accordance with the above examples. Thus, the sixth example provides the following advantages.

The controller 2 of the navigation apparatus 1 my analyze the image data output from the camera 20 to determine whether there is a large-size vehicle running ahead of the car C. If a large-size vehicle running ahead is detected, traffic signal guide information associated with the traffic signal S may be displayed on the windshield FG. This makes it possible to provide information associated with the traffic signal S located ahead of the car C when a driver cannot directly view the traffic signal S because of an obstacle such as a large-size vehicle. This prevents a vehicle from being suddenly stopped by an unexpected change of a traffic signal into a red-state, or quickly accelerated when a traffic signal changes into the red state in the middle of an intersection. Thus, the driver can safely drive a car in accordance with the traffic signal guide information.

Figure 17:
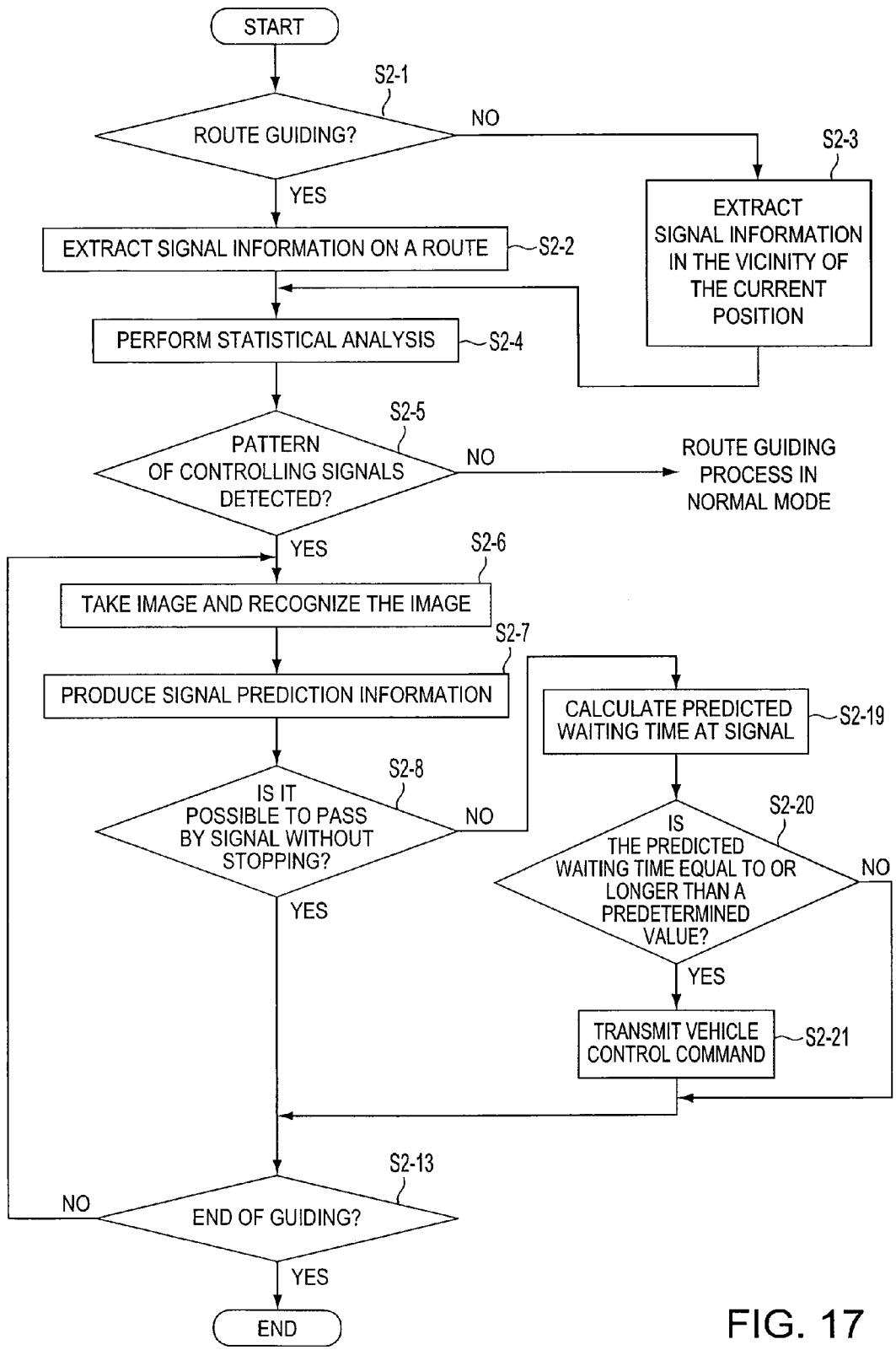
FIG. 17 is a diagram showing a display according to an exemplary implementation of the principles described herein.

Another example will be described below with reference to FIG. 17. This seventh example is similar to the above examples except for the following modifications. The exemplary method of this example may be implemented, for example, by the above-described navigation apparatus 1. However, it should again be appreciated that the example need not be limited by any of the above-described structure. The following explanation will be focused on differences from the above examples, and similar parts to those in the above examples are denoted by similar reference numerals and a further detailed description thereof is omitted.

When the car C cannot pass by a traffic signal S without stopping, the predicted waiting time at the traffic signal S may be calculated, and the car C may be controlled depending on the predicted waiting time.

Figure 7:
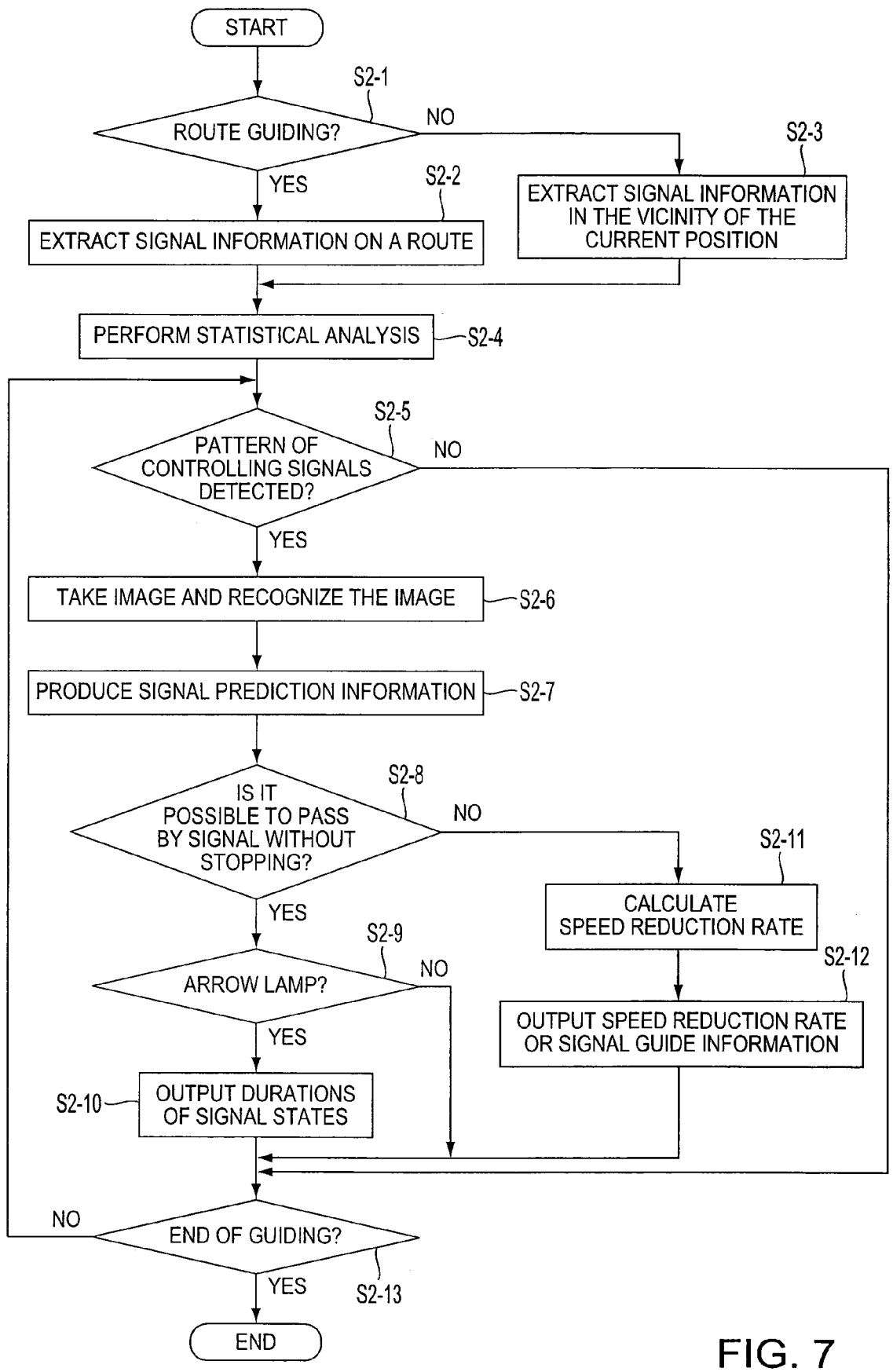
FIG. 7 shows a method of according to an exemplary implementation of the principles described herein.

In FIG. 7, if it is determined in that it is impossible to pass by a traffic signal without stopping (e.g., step S2-8), then the controller 2 may calculates the predicted waiting time at the traffic signal (step S2-19). For example, based on the traffic signal prediction information, the controller 2 may calculate the predicted period from a time at which the car C will stop to a time at which the green-signal lamp L indicating the permission of passing through the intersection is lit.

The controller 2 may determine whether the predicted waiting time is equal to or longer than a predetermined value (step S2-20). If the predicted waiting time is equal to or longer the predetermined value (example, e.g., about 60 sec) (step S2-20=YES), the controller 2 may transmit a vehicle control command to the electronic control unit 30 of the car C (step S2-21). In accordance with the command, the electronic control unit 30 may stops idling. If the predicted waiting time has elapsed, the controller 2 may transmit a drive command to the electronic control unit 30 to start the engine of the car C. The electronic control unit 30 may also perform a vehicle control process such as braking of the car C in accordance with a command transmitted from the controller 2 of the navigation apparatus 1.

If transmission of the control command to the electronic control unit 30 is completed, the controller 2 performs the route guiding process in accordance with the above examples. If the predicted waiting time is less than the predetermined value (step S2-20=NO), the controller 2 performs the route guiding process in accordance with the above examples. Thus, the seventh example provides the following advantages.

When the car C is closely approaching a traffic signal S, the controller 2 of the navigation apparatus 1 may calculate the predicted waiting time at the traffic signal S based on the statistical analysis on the traffic signal information 11 associated with the traffic signal S. If the predicted waiting time is equal to or longer than the predetermined value, the control command may be transmitted to the electronic control unit 30 of the car C. For example, when the predicted waiting time at a traffic signal is long, the operation of the car C is controlled in terms of braking or stopping of idling.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the first example, if it is determined that that there is no change in the pattern of controlling the state of the traffic signal S, such as the intervals at which the traffic signal state is switched and the duration of respective states, regardless of the time zone of the day, the image recognition of the traffic signal (step S2-6) may be omitted and the determination (in step S2-8) as to whether the car C can pass by the traffic signal S may be made without performing the image recognition of the traffic signal (step S2-6). In this case, the controller 2 may extracts the newest traffic signal information 11 associated with traffic signal S and employs the traffic signal state information 13 and the date/time information 14 thereof as initial values. The controller 2 may then calculate the predicted status at the current time based on the time from that date/time to the current time, the switching intervals of the traffic signal state, and/or durations of respective traffic signal states.

For example, if the traffic signal S was in the blue state at 9:00:10 on the day before the current day, the elapsed time from that time to the current time is calculated, and the current state of the traffic signal is predicted, for example, by dividing the elapsed time by the repetition period of the traffic signal. This makes it possible to provide traffic signal guide information even when it is impossible to take an image of the traffic signal lamp L because, for example, there is an obstacle such as a large-size vehicle running ahead of the car C.

For example, in the first example, the controller 2 may search for a route (step S1-2) and may produce traffic signal information 11 when the car C is running along the determined route. Alternatively, searching for a route may be omitted, and the traffic signal information 11 may be produced when the car C is running on an arbitrary road.

Additionally, the traffic signal location 12 does not necessarily need to be given in the form of 3-dimensional coordinate data, but the traffic signal location 12 may be given in the form of 2-dimensional data that does not have a component indicating the height of the traffic signal lamp L, especially where the height of the lamp L is standardized.

The driving mechanism of the camera 20 for controlling the orientation of the imaging lens may also be omitted.

In the third example, when the predicted waiting time is greater than the predetermined value, a detour route may be automatically displayed on the display 3.

In each example, the controller 2 may automatically control braking of the car C via the electronic control unit 30 in accordance with traffic signal prediction information. When the controller 2 determines that the predicted waiting time at a red traffic signal is longer than the predetermined value, the gear selection or stopping idling may be automatically performed via the electronic control unit 30.

Figure 18:
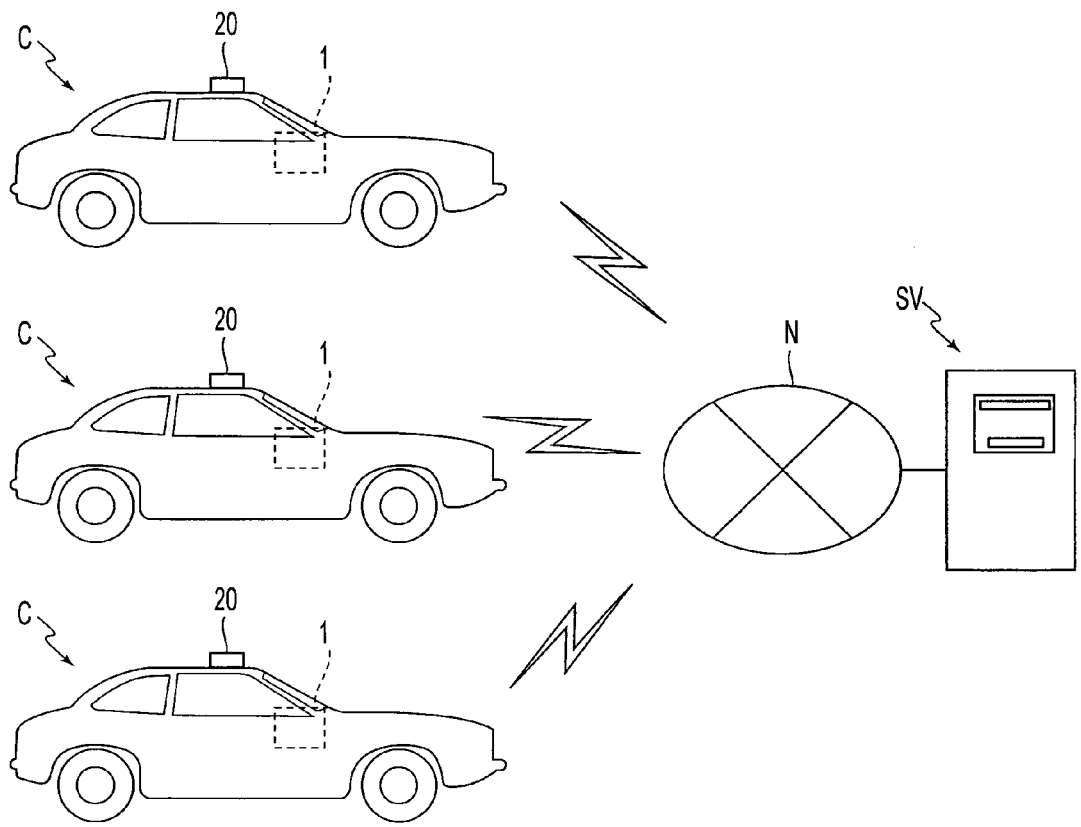
FIG. 18 is a diagram showing a system according to an exemplary implementation of the principles described herein.

In each example, the navigation apparatus 1 may be connected to a control server in the traffic signal information generation system. In this case, as shown in FIG. 18, the navigation apparatus 1 installed in the car C may be connected to the control server SV via the network N. The control server SV may collect traffic signal information 11 from a plurality of navigation apparatus 1 and may store the collected traffic signal information 11 in the database DB. Thus, a large number of pieces of traffic signal information 11 are collected from many cars, and the collected information is managed at the control server SV.

Thus, when a navigation apparatus 1 is approaching a traffic signal S, the navigation apparatus 1 may access the database DB stored in the control server SV to acquire the traffic signal information 11 associated with that traffic signal S. By collecting a large number of pieces of traffic signal information 11 from many navigation apparatus 1 in the above-described manner, it becomes possible to achieve a highly reliable database DB. In this case, the analysis of images and producing of the traffic signal information 11 may not be performed not by the controller 2 of the navigation apparatus 1 but may be performed by the control server SV.

When the controller 2 of the navigation apparatus 1 searches for a route from a current position to a destination, the controller 2 may calculate the predicated waiting time at each traffic signal on the route, based on the traffic signal information 11 associated with each traffic signal, and may select an optimum route that, for example, needs a shortest time to get to the destination, that needs a lowest consumption of gas, and/or that needs a least number of times the car C stops at red traffic signals. The controller 2 may calculate an optimum start time that allows it to reach a destination in a shortest time and may recommend the optimum start time to a user.

Figure 19:
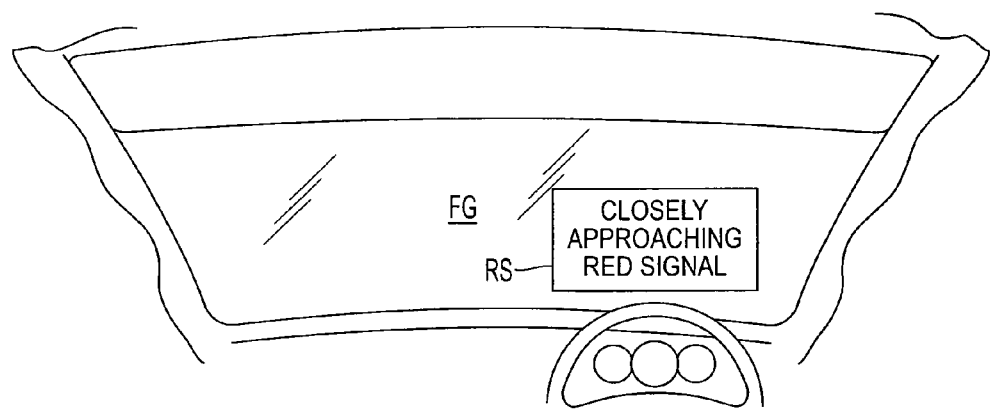
FIG. 19 is a diagram showing a display according to an exemplary implementation of the principles described herein.

The traffic signal guide information may be projected on an inner surface of a windshield. In this case, a projector (not shown) capable of transmitting and/or receiving data to/from the navigation apparatus 1 is installed inside the car C, and a semitransparent reflecting sheet RS is stuck on the windshield FG, as shown, for example, in FIG. 19. The projector may project traffic signal guide information onto the reflecting sheet RS to display the traffic signal guide information on the reflecting sheet RS. This makes it possible for a driver to view the traffic signal guide information without moving the direction of view.

The controller 2 may analyze motion image data output from the camera 20. The camera 20 may have an image recognition capability to recognize an image of a traffic signal S. In this case, the camera 20 may includes a controller that analyzes image data produced by an imaging part and transmits data indicating an analysis result to the controller 2 of the navigation apparatus 1. This may allow a reduction in the processing load imposed on the navigation apparatus 1.

The traffic signal guide information indicating switching of a traffic signal status, a predicted waiting time at a traffic signal, etc. to be notified to a user may be output in the form of a voice from a speaker of the navigation apparatus 1 or may be displayed on the display 3 of the navigation apparatus 1.

Although in the embodiments described above, traffic signal information 11 is produced by the navigation apparatus 1, the traffic signal information 11 may be produced by an apparatus that does not have a capability of searching for a route but that has at least a capability of detecting a current position (GPS receiver 7), a capability of transmitting and/or receiving data to/from the camera 20, a storage unit for storing traffic signal location information, and a storage unit for storing traffic signal information. This allows a reduction in the processing load imposed on the navigation apparatus.

Although in the fifth example, traffic signal guide information is displayed on the windshield FG of the car C, the traffic signal guide information may be displayed on the display 31, for example, disposed on the instrument panel or the display 3 of the navigation apparatus 1.

What is claimed is:

1. A method of producing traffic signal information, comprising:
    taking, when a vehicle is closely approaching a traffic signal, an image of traffic signal lamps disposed on the traffic signal;
    producing image data of the traffic signal lamps based on the taken image;
    analyzing the image data;
    producing traffic signal state information, the traffic signal state information including a state of the traffic signal as of the time of taking the image of the traffic signal lamps;
    storing traffic signal information in a memory, the traffic signal information including the produced traffic signal state information, traffic signal location information, and time information; and
    performing a statistical analysis on a correlation in terms of the status of traffic signal lamps among a plurality of adjacent traffic signals based on plural pieces of traffic signal information of plural traffic signals.

2. The method of claim 1, wherein:
    taking the image of the traffic signal lamps disposed on the traffic signal comprises taking an image of the traffic signal lamps disposed on the traffic signal a plurality of times; and producing the image data of the traffic signal lamps comprises producing image data for each of the plurality of taken images.

3. The method of claim 2, further comprising detecting, based on the plurality of produced image data, a changing of the traffic signal, wherein:
analyzing the image data comprises analyzing each of the plurality of produced image data to monitor the status of the traffic signal lamps; and
producing the traffic signal state information comprises producing the traffic signal information when the changing of the traffic signal is detected.

4. The method of claim 1, further comprising:
detecting the location of the traffic signal, the traffic signal being on a route from a current position of the vehicle to a destination, or being in the vicinity of the current position of the vehicle, based on map attribute information stored in the memory;
determining a distance between the vehicle and the traffic signal; and
transmitting, when the distance between the vehicle and the traffic signal is at least a predetermined value, instructions to a camera to start taking the image of traffic signal lamps.

5. The method of claim 1, further comprising:
transmitting the traffic signal information to a server, the server including a memory that stores the traffic signal information, the server connected to a network.

6. The method of claim 1, further comprising:
storing a result of the statistical analysis in the memory, the statistical analysis result linked to the traffic signal information.

7. The method of claim 6, further comprising:
producing, when the vehicle is closely approaching the traffic signal, traffic signal guide information based on the statistical analysis; and
outputting the produced traffic signal guide information.

8. The method of claim 7, wherein the traffic signal guide information is associated with a plurality of adjacent traffic signals including the traffic signal that the vehicle is closely approaching.

9. The method of claim 1, further comprising:
producing, if when the vehicle is closely approaching the traffic signal it is impossible to identify of the state of the traffic signal, traffic signal guide information based on the statistical analysis of the traffic signal information associated with the traffic signal; and
outputting the produced traffic signal guide information based on the statistical analysis.

10. The method of claim 9, wherein the produced traffic signal guide information indicates the state of the traffic signal.

11. The method of claim 1, further comprising:
predicting, if when the vehicle is closely approaching the traffic signal a stop-lamp of the traffic signal is in an on-state, the length of a stop period at the traffic signal based on the statistical analysis of the produced traffic signal information; and
transmitting, if the predicted length of the stop period is at least a predetermined length of time, a control command to a controller disposed on the vehicle to control the vehicle.

12. The method of claim 1, wherein the memory is in an in-vehicle terminal.

13. The method of claim 1, wherein the memory is in a server, the server capable of communicating with an in-vehicle terminal.

14. An in-vehicle terminal, comprising:
a controller that:
produces image data of the traffic signal lamps based on a taken image, the taken image being taken when a vehicle is closely approaching a traffic signal;
analyzes the image data;
produces traffic signal state information, the traffic signal state information including a state of the traffic signal as of the time of taking the image of the traffic signal lamps;
stores traffic signal information in a memory, the traffic signal information including the produced traffic signal state information, traffic signal location information, and time information; and
performs a statistical analysis on a correlation in terms of the status of traffic signal lamps among a plurality of traffic signals based on plural pieces of traffic signal information of plural adjacent traffic signals.

15. An in-vehicle terminal, comprising:
a controller that:
produces image data of the traffic signal lamps based on a taken image, the taken image being taken when a vehicle is closely approaching a traffic signal;
analyzes the image data;
produces traffic signal state information, the traffic signal state information including a state of the traffic signal as of the time of taking the image of the traffic signal lamps;
stores traffic signal information in a memory, the traffic signal information including the produced traffic signal state information, traffic signal location information, and time information; and
performs a statistical analysis on a correlation in terms of the status of traffic signal lamps among a plurality of adjacent traffic signals based on plural pieces of traffic signal information of plural traffic signals.

16. The in-vehicle terminal of claim 14, further comprising the memory.

17. A traffic signal information system, comprising:
the in-vehicle terminal of claim 14; and
a camera that takes the image of the traffic signal lamps disposed on the traffic signal.

18. A traffic signal information system, comprising:
the in-vehicle terminal of claim 14; and
a server, the server comprising the memory.

19. A computer-readable storage medium storing a set of computer-executable program instructions executable on a data processing device and usable to produce traffic signal information, the program comprising:
instructions for taking, when a vehicle is closely approaching a traffic signal, an image of traffic signal lamps disposed on the traffic signal;
instructions for producing image data of the traffic signal lamps based on the taken image;
instructions for analyzing the image data;
instructions for producing traffic signal state information, the traffic signal state information including a state of the traffic signal as of the time of taking the image of the traffic signal lamps;
instructions for storing traffic signal information in a memory, the traffic signal information including the produced traffic signal state information, traffic signal location information, and time information; and
instructions for performing a statistical analysis on a correlation in terms of the status of traffic signal lamps among a plurality of traffic signals based on plural pieces of traffic signal information of plural adjacent traffic signals.

20. A computer-readable storage medium storing a set of computer-executable program instructions executable on a data processing device and usable to produce traffic signal information, the program comprising:

instructions for taking, when a vehicle is closely approaching a traffic signal, an image of traffic signal lamps disposed on the traffic signal;

instructions for producing image data of the traffic signal lamps based on the taken image;

instructions for analyzing the image data;

instructions for producing traffic signal state information, the traffic signal state information including a state of the traffic signal as of the time of taking the image of the traffic signal lamps;

instructions for storing traffic signal information in a memory, the traffic signal information including the produced traffic signal state information, traffic signal location information, and time information; and instructions for performing a statistical analysis on a correlation in terms of the status of traffic signal lamps among a plurality of adjacent traffic signals based on plural pieces of traffic signal information of plural traffic signals.

* * * * *